US008781288B2

United States Patent
Fukushima

(10) Patent No.: US 8,781,288 B2
(45) Date of Patent: Jul. 15, 2014

(54) DIGITAL BROADCAST RECEIVING APPARATUS

(75) Inventor: Masaru Fukushima, Kanagawa (JP)

(73) Assignee: Kyocera Corporation, Kyoto (JP)

(*) Notice: Subject to any disclaimer, the term of this patent is extended or adjusted under 35 U.S.C. 154(b) by 1358 days.

(21) Appl. No.: 11/571,425

(22) PCT Filed: Jun. 29, 2005

(86) PCT No.: PCT/JP2005/011975

§ 371 (c)(1), (2), (4) Date: May 15, 2008

(87) PCT Pub. No.: WO2006/001481

PCT Pub. Date: Jan. 5, 2006

(65) Prior Publication Data

US 2008/0240681 A1 Oct. 2, 2008

(30) Foreign Application Priority Data

Jun. 29, 2004 (JP) ................................ 2004-191963
Jun. 29, 2004 (JP) ................................ 2004-191964

(51) Int. Cl.
*H04N 5/91* (2006.01)

(52) U.S. Cl.
USPC ............... 386/96; 386/83; 386/244; 386/248; 386/292

(58) Field of Classification Search
USPC ........................................................... 386/83
See application file for complete search history.

(56) References Cited

U.S. PATENT DOCUMENTS 6,185,360 B1 * 2/2001 Inoue et al. ................... 386/248
6,628,891 B1 * 9/2003 Vantalon et al. .............. 386/255
7,529,462 B2 * 5/2009 Peters et al. .................. 386/292
8,528,019 B1 * 9/2013 Dimitrova et al. .............. 725/46
2001/0010757 A1 * 8/2001 Mori et al. ...................... 386/98
2002/0127002 A1 * 9/2002 Mori et al. .................... 386/126

(Continued)

FOREIGN PATENT DOCUMENTS

CN 1553705 A 12/2004
EP 0896337 A2 2/1999

(Continued)

OTHER PUBLICATIONS

Chinese language office action and its English language translation for corresponding Chinese application 200580021528.6 lists the reference above.

(Continued)

*Primary Examiner* — Kambiz Zand
*Assistant Examiner* — Yonas Bayou
(74) *Attorney, Agent, or Firm* — DLA Piper LLP (US)

(57) ABSTRACT

A portable telephone 100 with broadcast receiving function has a portable telephone device and a digital broadcast receiving apparatus. A recording format selection section 116 in the digital broadcast receiving apparatus records, in a recording section 117 such as nonvolatile semiconductor memory, any of a video signal, an audio signal and a data signal which are separated by a transport stream (TS) separating section 105, in accordance with a designated recording format or contents of a broadcast program, from a recording start time to a recording end time. An attempt is made to make the quantity of data signal to be recorded in the recording section 117 appropriate, and diminish power consumed by a battery of the portable telephone 100 with broadcast receiving function.

9 Claims, 13 Drawing Sheets

(56) References Cited

U.S. PATENT DOCUMENTS

| | | | | |
|---|---|---|---|---|
| 2002/0127003 | A1* | 9/2002 | Mori et al. | 386/126 |
| 2002/0138838 | A1* | 9/2002 | Peters et al. | 725/58 |
| 2003/0059047 | A1* | 3/2003 | Iwamura | 380/201 |
| 2003/0175016 | A1 | 9/2003 | Mori et al. | |
| 2003/0208771 | A1* | 11/2003 | Hensgen et al. | 725/100 |
| 2004/0047590 | A1* | 3/2004 | Matsuo | 386/46 |
| 2004/0204020 | A1* | 10/2004 | Kuramitsu | 455/550.1 |
| 2006/0248551 | A1* | 11/2006 | Taugher et al. | 720/659 |
| 2006/0248561 | A1* | 11/2006 | Hashimoto et al. | 725/100 |

FOREIGN PATENT DOCUMENTS

| | | |
|---|---|---|
| JP | 10-174037 | 6/1998 |
| JP | 2000-009920 | 1/2000 |
| JP | 2001-197447 | 7/2001 |
| JP | 2002-9920 | 1/2002 |
| JP | 2002330382 A | 11/2002 |
| JP | 2003-37794 | 2/2003 |
| JP | 2003-134250 | 5/2003 |
| JP | 2003-196227 | 6/2003 |
| JP | 2003-333000 | 11/2003 |
| JP | 2003-333532 | 11/2003 |
| JP | 2004-32250 | 1/2004 |
| JP | 2004-104518 | 4/2004 |

OTHER PUBLICATIONS

Yamagishi, “Overview of DVB-SI Defined Metadata” TV Anytime Meeting, Jul. 25, 2000 to Jul. 27, 2000; Geneva; FTP://FTP.BBC.CO.UK, Jul. 18, 2000.

Japanese language office action and its English language translation for corresponding Japanese application 2004191964 lists the references above.

Chinese language office action dated Sep. 22, 2011 and its English language translation for corresponding Chinese application 201110048262.1 cites the foreign patent document above.

Partial European search report dated Nov. 2, 2012 issued in corresponding European application 12173264.8.

* cited by examiner

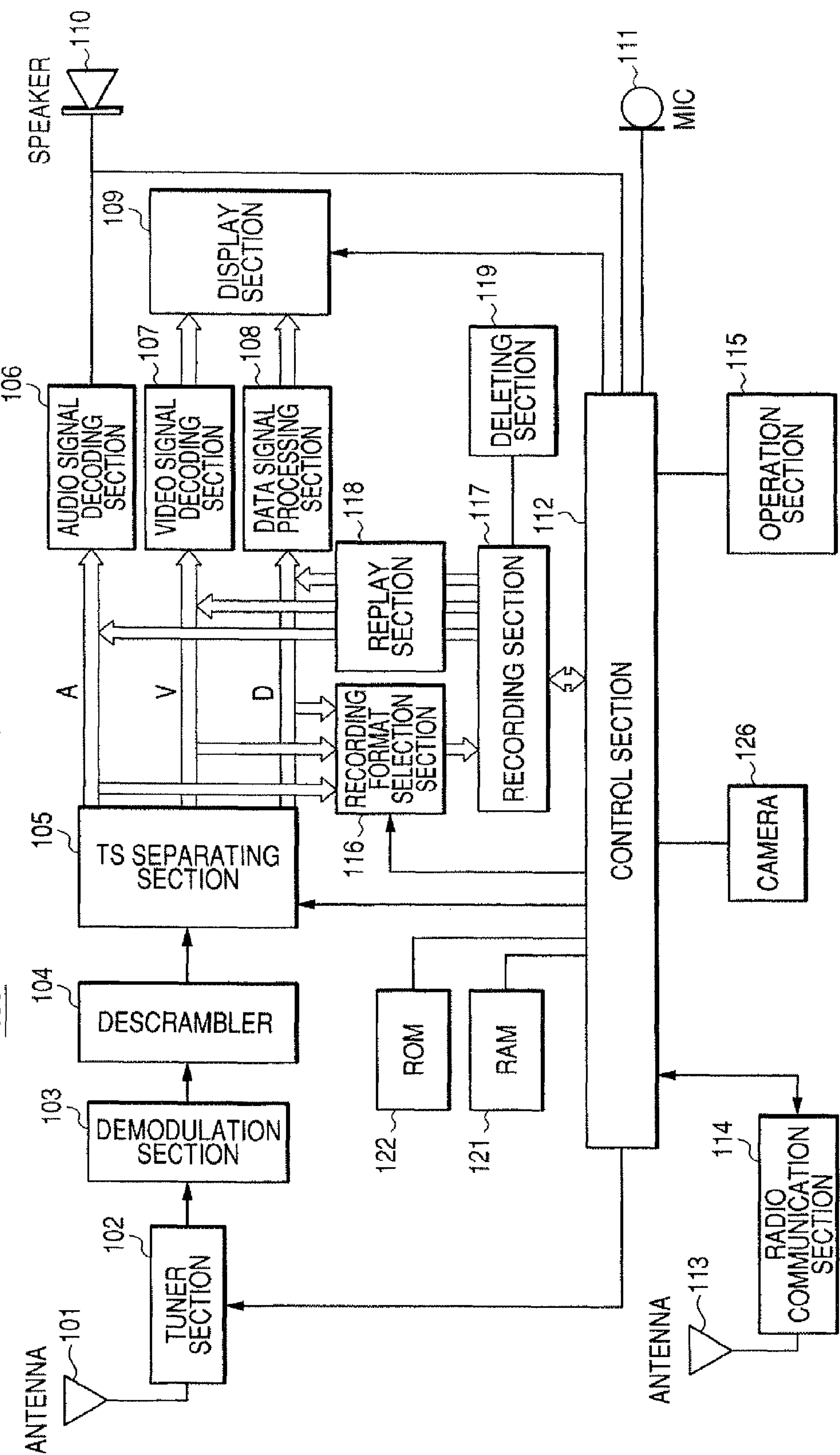
FIG. 1
100
ANTENNA
101
TUNER SECTION
102
DEMODULATION SECTION
103
DESCRAMBLER
104
TS SEPARATING SECTION
105
A
V
D
AUDIO SIGNAL DECODING SECTION
106
VIDEO SIGNAL DECODING SECTION
107
DATA SIGNAL PROCESSING SECTION
108
DISPLAY SECTION
109
SPEAKER
110
MIC
111
CONTROL SECTION
112
ANTENNA
113
RADIO COMMUNICATION SECTION
114
OPERATION SECTION
115
RECORDING FORMAT SELECTION SECTION
116
RECORDING SECTION
117
REPLAY SECTION
118
DELETING SECTION
119
RAM
121
ROM
122
CAMERA
126

TRANSPORT (TS)
VIDEO
AUDIO
DATA
PROGRAM INFORMATION
VIDEO
AUDIO
DATA
PROGRAM INFORMATION
VIDEO
AUDIO
DATA
PROGRAM INFORMATION
SYNC
....
PAYLOAD
HEADER
AUDIO DATA

FIG. 7(a)
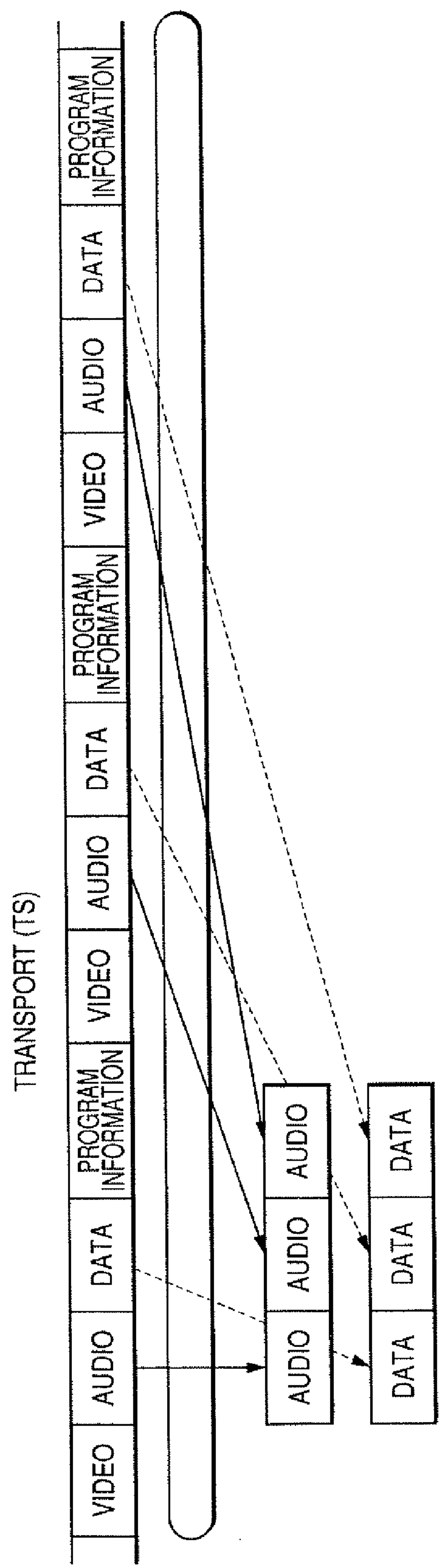
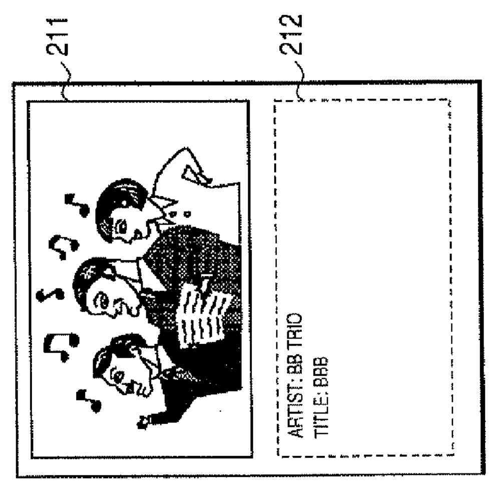
FIG. 7(b)

TIME t
CONTENTS OF BROADCAST (VIDEO)
TODAY'S NEWS 1
TODAY'S NEWS 2
TODAY'S NEWS 3
TODAY'S NEWS N
NATIONWIDE WEATHER FORECAST
CONTENTS OF BROADCAST (DATA)
TODAY'S NEWS 1 TO N
NATIONWIDE WEATHER FORECAST
Δt
RECORDING ENABLED/DISABLED
○
×
×
×
×
×
×
○
×
×

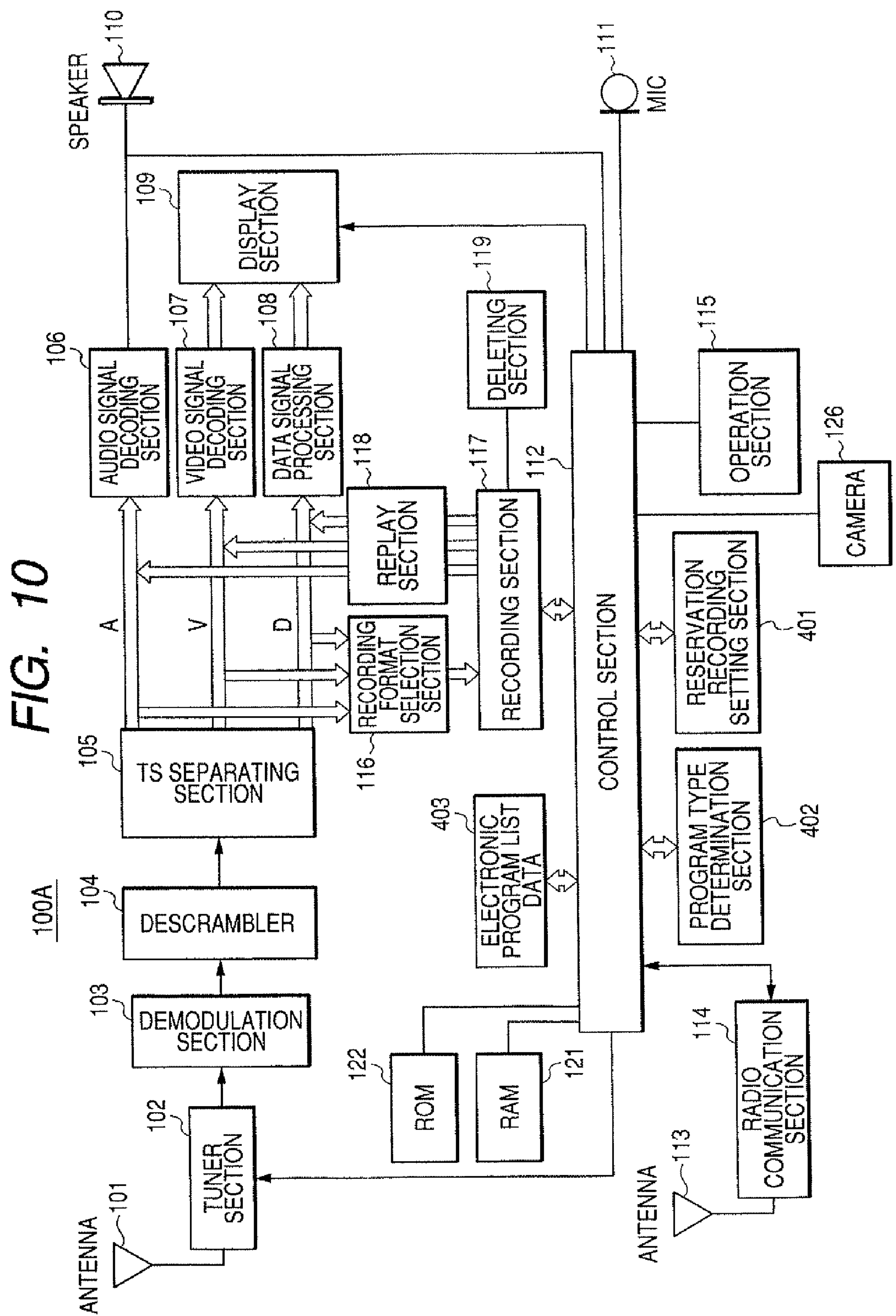
FIG. 10
100A
ANTENNA
101
TUNER SECTION
102
DEMODULATION SECTION
103
DESCRAMBLER
104
TS SEPARATING SECTION
105
A
V
D
AUDIO SIGNAL DECODING SECTION
106
VIDEO SIGNAL DECODING SECTION
107
DATA SIGNAL PROCESSING SECTION
108
DISPLAY SECTION
109
SPEAKER
110
MIC
111
CONTROL SECTION
112
ANTENNA
113
RADIO COMMUNICATION SECTION
114
OPERATION SECTION
115
RECORDING FORMAT SELECTION SECTION
116
RECORDING SECTION
117
REPLAY SECTION
118
DELETING SECTION
119
RAM
121
ROM
122
CAMERA
126
RESERVATION RECORDING SETTING SECTION
401
PROGRAM TYPE DETERMINATION SECTION
402
ELECTRONIC PROGRAM LIST DATA
403

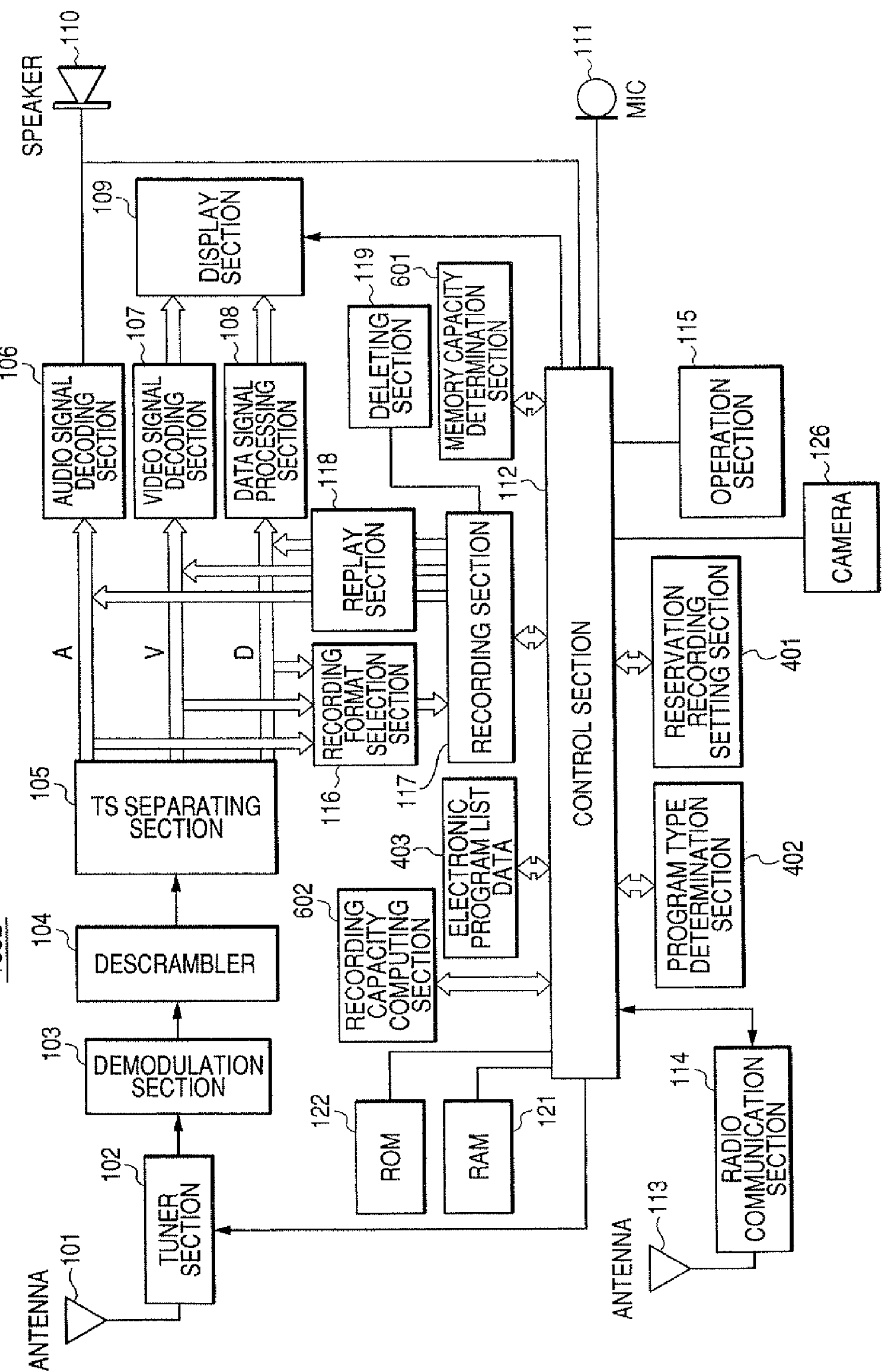
FIG. 12
100B
ANTENNA
101
TUNER SECTION
102
DEMODULATION SECTION
103
DESCRAMBLER
104
TS SEPARATING SECTION
105
A
V
D
AUDIO SIGNAL DECODING SECTION
106
VIDEO SIGNAL DECODING SECTION
107
DATA SIGNAL PROCESSING SECTION
108
DISPLAY SECTION
109
SPEAKER
110
MIC
111
REPLAY SECTION
118
RECORDING FORMAT SELECTION SECTION
116
RECORDING SECTION
117
DELETING SECTION
119
MEMORY CAPACITY DETERMINATION SECTION
601
ELECTRONIC PROGRAM LIST DATA
403
RECORDING CAPACITY COMPUTING SECTION
602
CONTROL SECTION
112
ROM
122
RAM
121
OPERATION SECTION
115
CAMERA
126
RESERVATION RECORDING SETTING SECTION
401
PROGRAM TYPE DETERMINATION SECTION
402
ANTENNA
113
RADIO COMMUNICATION SECTION
114

ANTENNA
701
TUNER SECTION
702
DEMODULATION SECTION
703
DESCRAMBLER
704
TS SEPARATING SECTION
705
AUDIO SIGNAL DECODING SECTION
706
VIDEO SIGNAL DECODING SECTION
707
DATA SIGNAL PROCESSING SECTION
708
DISPLAY SECTION
709
SPEAKER
710
MIC
711
CONTROL SECTION
712
ANTENNA
713
TRANSMITTING/ RECEIVING SECTION
714
NONVOLATILE MEMORY
715
CAMERA
716
OPERATION SECTION
717

DIGITAL BROADCAST RECEIVING APPARATUS

FIELD OF THE INVENTION

The present invention relates to a digital broadcast receiving apparatus capable of receiving a digital broadcast signal. More specifically, the present invention relates to an apparatus capable of recording and replaying digital broadcast contents.

BACKGROUND ART

In recent years, there has been remarkable advancement of electronic communication techniques in a mobile terminal device typified by a portable telephone. Such a mobile terminal device has become multifunctional and of higher functionality caused by convenience, and the range of application of the mobile terminal device is now expanding. Examples of multifunctionality and higher functionality include, e.g., a communication function such as Internet, an electronic mail function, a game, playback of music, reception of FM broadcasts, and the like.

Incidentally, as a result of a progress in digitization of satellite broadcasts and terrestrial broadcasts, high image quality, interactive (interacting) broadcasts involving audience participation, and digital broadcasts which enable data broadcasts have become possible. In addition to digitization of the broadcasts by audio and images, data broadcasts such as a weather forecast, stock market information, and various news have become digitized and aired.

A portable telephone having a built-in TV tuner has also been known, as described in, e.g., Patent Document 1. In the fields of terrestrial digital broadcasts and satellite digital broadcasts, broadcasts using a one-segment or three-segment transmission band designed mainly for a compact receiver having high portability are scheduled.

Under the above-described circumstances, a device capable of receiving, replaying, and recording the above digital broadcasts are desirably integrated into a single device, with a portable telephone typified by a mobile terminal device.

However, constraints such as life and power capacity of a battery and recording capacity cannot be surmounted by mere integration of an existing portable telephone and the above digital broadcast receiving apparatus.

One example configuration of a digital broadcast receiving apparatus intended for a case where a portable telephone and a device capable of receiving digital broadcasts are integrated by an existing method is described by reference to FIG. 13.

An antenna 713, a transmitting/receiving section 714, a nonvolatile memory 715, a camera 716, an operation section 717, and a microphone (MIC) 711 are provided for fulfilling the basic functions of the portable telephone.

The configuration of the digital broadcast receiving apparatus illustrated in FIG. 13 will now be described.

A broadcast wave is received by an antenna 701 for receiving a broadcast wave, and a channel is selected by a tuner section 702 used for tuning a frequency to a designated program. The signal extracted by the tuner section 702 is demodulated by a demodulation section 703, and the demodulation section 703 outputs a transport stream (TS).

Here, TS is information in which an image signal (a video signal), a voice signal (an audio signal) and a data signal have been multiplexed. Specific examples of TS will be described in association with descriptions of embodiments of the present invention by reference to FIG. 2.

When the transport stream (TS) output from the demodulation section 703 is scrambled, a descrambler 704 descrambles the scrambled TS.

A TS separating section 705 separates the descrambled transport stream (TS) into a video signal, an audio signal and a data signal.

The video signal separated by the TS separating section 705 is decoded by a video signal decoding section 707, and the decoded signal is displayed as an image on a display section 709. The audio signal separated by the TS separating section 705 is demodulated by an audio signal decoding section 706, and the demodulated signal is output as sound from a speaker 710.

The data signal separated by the TS separating section 705 is processed by a data signal processing section 708, to thus be converted into display data, whereupon the data are displayed in the form of characters, numerals, or drawings on the display section 709.

A control section 712 controls the portable telephone or tuning operation of the tuner section 702.

When digital broadcasts are recorded by the above digital broadcast receiving apparatus, a designated program is recorded at a designated time by a method for re-encoding the video signal and the audio signal, which have been replayed as mentioned previously, or by recording a transport stream.

Patent Document 1: JP-A-2002-9920

DISCLOSURE OF THE INVENTION

Problem that the Invention is to Solve

However, more integration of the mobile device and the above-described digital broadcast receiving apparatus encounters the following problems.

Under a related-art method for recording digital broadcasts, all contents of a designated program are recorded into a memory at a designated time, and hence recording requires a large volume of memory. Further, large-capacity memory is required.

Even when a large number of memories or a large-capacity memory is used, a problem arises such as an increase in power consumed by a battery (a storage battery).

When the memory of a built-in recording medium is small, a recording time eventually becomes shorter. When a long-hour program such as a sports program is recorded, there exist drawbacks such that recording the program up to the result of the program is impossible and high-cost memory has to be mounted so as to record the program until the end of the program.

In relation to a portable device which is limited in terms of capacity of storage memory incorporated into the device, as in the case of a portable telephone, all contents of a program must be recorded although the contents of the recorded program corresponds to a mere data signal or voice signal such as a music program or a piece of news. Since the video signal, the voice signal and the data signal cannot be deleted individually, or the plurality of signals cannot be deleted, effective use of recording memory is difficult.

A problem to be solved by the present invention is to provide a compact and lightweight digital broadcast receiving apparatus, which has superior portability and is practically available.

Another object of the present invention is preferably to provide a digital broadcast receiving apparatus, which overcomes the above problems and is suitable for a mobile unit.

Means for Solving the Problem

In order to solve the above-mentioned problems, a configuration of the present invention is provided as described below.

A digital broadcast receiving apparatus that receives and outputs a stream to which a video signal, an audio signal and a data signal are multiplexed, the digital broadcast receiving apparatus comprising:

a separating section for separating the video signal, the audio signal and the data signal from each other, which are included in the received stream;

a designating section for designating which signal of the signals separated by the separating section is to be recorded; and a recording section for recording the signal included in the stream based on the designation by the designating section.

The digital broadcast receiving apparatus as provided above, wherein the designating section designates the signal to be recorded based on a content of a program to be recorded.

The digital broadcast receiving apparatus as provided above, wherein when the designating section designates recording of the data signal, the recording section records the data signal of a program that is an object of recording toy intermittently receiving the program.

The digital broadcast receiving apparatus as provided above, wherein when the designating section designates recording of the data signal, the recording section records only the last data signal of a program that is an object of recording.

The digital broadcast receiving apparatus as provided above, further comprising:

a reservation section for reserving a program to be recorded; and a prediction section for predicting whether or not the program reserved by the reservation section can be recorded entirely in the recording section, wherein when the prediction section predicts that it is not possible to record all the program, the recording section records only the last data signal of the program that is an object of recording.

The digital broadcast receiving apparatus as provided above, wherein the recording section monitors a remaining capacity in the recording section while recording, and when the remaining capacity exceeds a predetermined value, the recording section stops the recording operation and records only the last data signal of the program.

The digital broadcast receiving apparatus as provided above, wherein the designating section designates any combination of signals of the video signal, the audio signal and the data signal is to be recorded.

The digital broadcast receiving apparatus as provided above, further comprising:

a communication section connected to a radio communication network;

a detection section for detecting an incoming call through the communication section;

a setting section for setting an incoming call processing operation to be performed when the incoming call is detected during the recording operation; and a control section for performing the incoming call processing operation based on the setting of the setting section when the incoming call is detected during the recording operation.

A digital broadcast receiving apparatus that receives and outputs a stream to which a video signal, an audio signal and a data signal are multiplexed, the digital broadcast receiving apparatus comprising:

a recording section for recording the video signal, the audio signal and the data signal which are included in the received stream;

a designating section for designating a specific signal among the signals recorded in the recording section; and a replay section for replaying only the signal designated by the designating section.

The digital broadcast receiving apparatus as provided above, further comprising:

a separating section for separating the video signal, the audio signal and the data signal from each other, which are included in the received stream, wherein the recording section records each of the signals separated by the separating section as different files, the designating section designates the file, and the replay section replays the designated file.

A digital broadcast receiving apparatus that receives and outputs a stream to which a video signal, an audio signal and a data signal are multiplexed, the digital broadcast receiving apparatus comprising:

a recording section for recording the video signal, the audio signal and the data signal which are included in the received stream;

a designating section for designating a specific signal among the signals recorded in the recording section; and a deleting section for deleting only the signal designated by the designating section.

The digital broadcast receiving apparatus as provided above, further comprising:

a separating section for separating the video signal, the audio signal and the data signal from each other, which are included in the received stream, wherein the recording section records each of the signals separated by the separating section as different files, the designating section designates the file, and the deleting section deletes the designated file.

Advantages of the Invention

Since the digital broadcast receiving apparatus of the present invention is configured to be able to select a recording scheme complying with contents of a broadcast by the configurations provided above, low power consumption and diminishment of storage capacity can be achieved.

According to the digital broadcast receiving apparatus of the present invention, a replaying scheme, which complies with the usage mode employed by the user and the status of the device, can be selected. Also, unnecessary signal can be deleted individually, and hence the recording amount can be reduced. Preferably, the receiver is effective for a portable device having small recording capacity.

BRIEF DESCRIPTION OF THE DRAWINGS

FIG. 1 is a block diagram of a device (a portable telephone with broadcast receiving function) which acts as a first embodiment of a digital broadcast receiving apparatus of the present invention, and into which a portable telephone and a digital broadcast receiving apparatus are integrated;

FIG. 7 is a view for describing a replay process of an embodiment, wherein (a) shows a process of generating a file, and (b) shows an example of display of a digital broadcast service;

FIG. 10 is a block diagram of a portable telephone with broadcast receiving function provided with a reservation recording setting section, as a third embodiment of the present invention;

FIG. 12 is a block diagram of a portable telephone equipped with a memory capacity determination section, in a portable telephone with broadcast receiving function according to a fourth embodiment of the present invention.

DESCRIPTIONS OF THE REFERENCE NUMERALS

Figure 2:
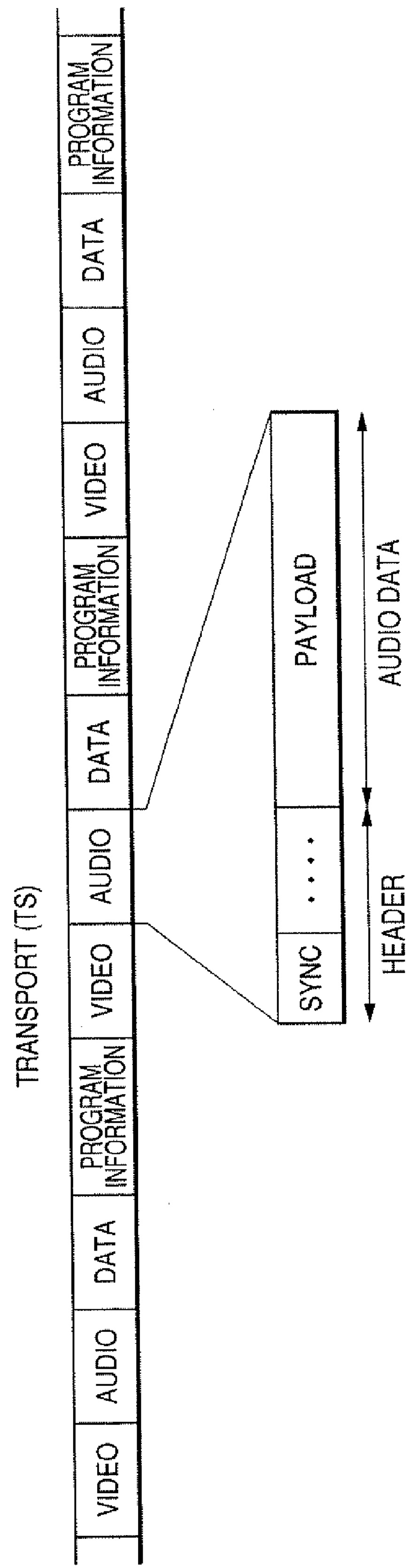
FIG. 2 is a view showing an example of a transport stream (TS) signal.
Figure 3A:
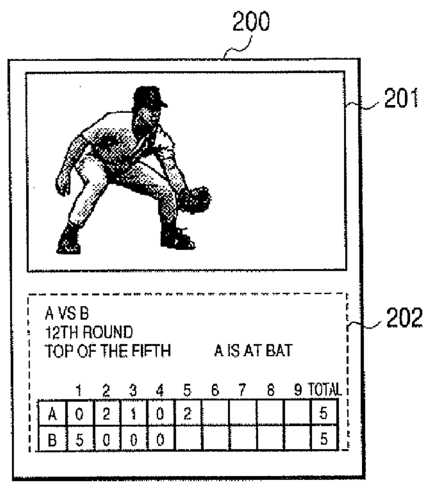
FIGS. 3(*a*) to 3(*d*) are views showing examples of a broadcast of a digital broadcast applied to the portable telephone with broadcast receiving function illustrated in FIG. 1.
Figure 3B:
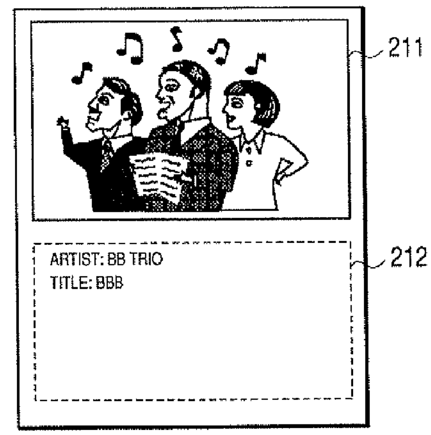
Figure 3C:
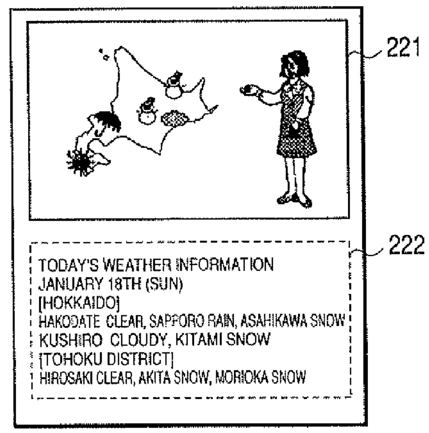
Figure 3D:
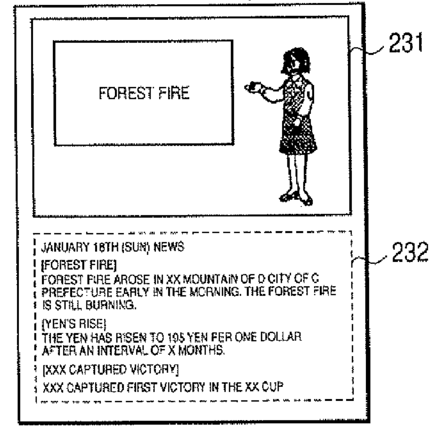
Figure 4A:
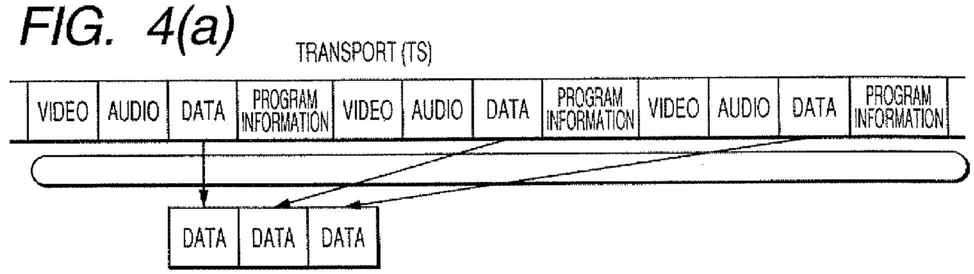
FIGS. 4(*a*) to 4(*d*) are views showing examples of signals selected from the transport stream (TS)
Figure 4B:
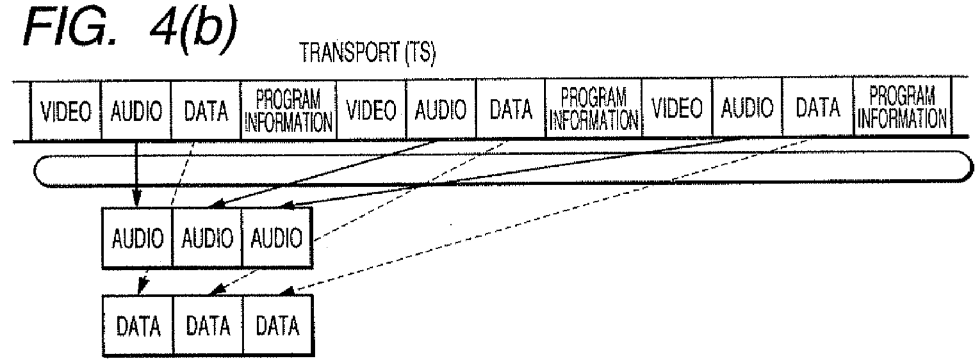
Figure 4C:
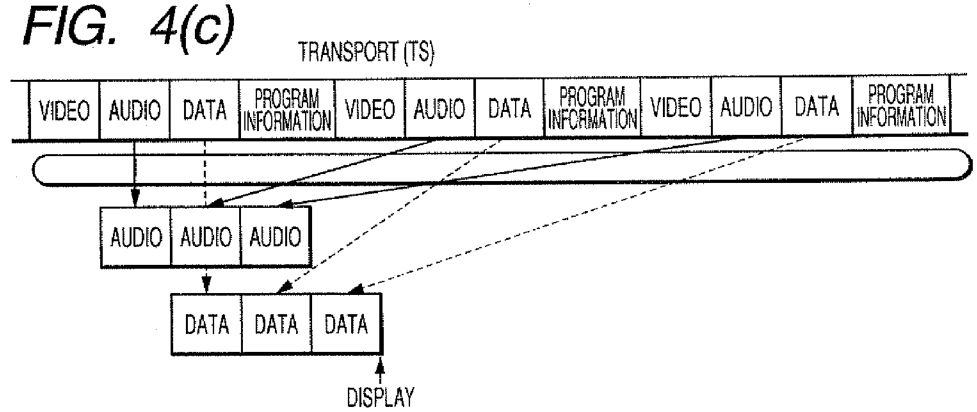
Figure 4D:
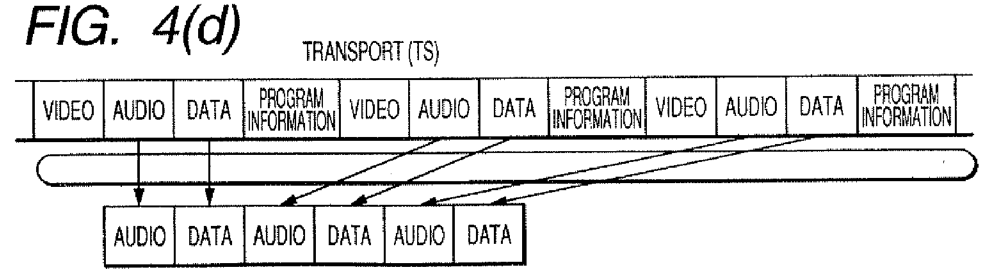

100, 100A, 100B . . . PORTABLE TELEPHONE WITH BROADCAST RECEIVING FUNCTION
101 . . . ANTENNA FOR RECEIVING DIGITAL BROADCASTS
102 . . . TUNER SECTION,
103 . . . DEMODULATION SECTION
104 . . . DESCRAMBLER
105 . . . TS SEPARATING SECTION
106 . . . AUDIO SIGNAL DECODING SECTION
107 . . . VIDEO SIGNAL DEMODULATION SECTION
108 . . . DATA SIGNAL PROCESSING SECTION
109 . . . DISPLAY SECTION
110 . . . SPEAKER
111 . . . MICROPHONE (MIC)
112 . . . CONTROL SECTION
113 . . . ANTENNA FOR PORTABLE TELEPHONE
114 . . . RADIO COMMUNICATION SECTION
115 . . . OPERATION SECTION
116 . . . RECORDING FORMAT SELECTION SECTION
117 . . . RECORDING SECTION
118 . . . REPLAY SECTION
119 . . . DELETING SECTION
126 . . . CAMERA SECTION
100A . . . PORTABLE TELEPHONE WITH BROADCAST RECEIVING FUNCTION
401 . . . RESERVATION RECORDING SETTING SECTION
402 . . . PROGRAM TYPE DETERMINATION SECTION
403 . . . ELECTRONIC PROGRAM LIST DATA
100B . . . PORTABLE TELEPHONE WITH BROADCAST RECEIVING FUNCTION
601 . . . MEMORY CAPACITY DETERMINATION SECTION
602 . . . RECORDING CAPACITY COMPUTING SECTION

BEST MODES FOR IMPLANTING THE INVENTION

Programs (contents) of a broadcast have become diversified; e.g., sports, music, dramas, movies, news, variety shows, and animation. In some programs, such as movies, dramas, and animation, the thread of a narrative is lost unless the program is viewed continuously. However, in some other programs, such as sports or news, events in progress may be omitted, so long as the viewer can view only the endings of sport or news.

In the sports program or a news program, the majority of users will be satisfied, so long as only the result of a sporting competition or news can be recorded. Conversely, when the result cannot be recorded, there are many cases where a failure to record the result will induce great dissatisfaction.

In the case of a music program, when recorded music is listened to later, there may be conceived a case where video contents are not required.

As mentioned above, according to the type of a program of the broadcast, the programs can be divided into programs which require recording of all contents and others which do not require recording of all contents.

When data are broadcast simultaneously as videos and audio, data serves as a complement to audio (e.g., a progress of points scored in a broadcast of a baseball game, or the like). Therefore, in relation to a data broadcast, there is no necessity for continuously recording the broadcasted data signal.

The present invention provides an effective, highly useful (practical) digital broadcast receiving apparatus which takes into consideration characteristics of contents of a broadcast.

By reference to the drawings, there will be described a preferred embodiment of a digital broadcast, receiving apparatus of the present invention which can receive a digital broadcast, replay and output contents of the received broadcast, record (store) any desired one among the contents of the received broadcast in a desired format, and again output the recorded contents of the broadcast.

The configuration of a device into which the digital broadcast, receiving apparatus and a portable telephone typified by a mobile device are integrated is illustrated as a preferred exemplification of a digital broadcast receiving apparatus of the present invention.

The device according to the present invention, into which the digital broadcast receiving apparatus and the portable telephone are integrated, will be hereinbelow called a portable telephone with broadcast receiving function.

A terrestrial digital broadcast is illustrated as a broadcast wave being broadcasted in connection with the embodiment of the digital broadcast receiving apparatus of the present invention.

First Embodiment

FIG. 1 is a block diagram of a portable telephone with broadcast receiving function according to a first embodiment of the present invention.

A portable telephone with broadcast receiving function 100, shown in FIG. 1, has a common section, a portable telephone section, and a digital broadcast receiving apparatus section.

The portable telephone with broadcast receiving function 100 has, as the common section, a control section 112, RAM 121, ROM 122, an operation section 115, a display section 109, a recording section 117, and a speaker 110.

In addition to having the common section, the portable telephone with broadcast receiving function 100 has, as a section for realizing the function of a portable telephone, a portable telephone antenna 113, a radio communication section 114, and a microphone (MIC) 111. An adjustment section for performing processing such as automatic focus adjustment and automatic illumination adjustment, can be additionally provided as the portable telephone section comprising a camera section 126, which is formed from a lens, a CCD, as required.

In addition to the common section, the portable telephone with broadcast receiving function 100 has as a section for implementing the function of the digital broadcast receiving apparatus, a digital broadcast receiving antenna 101, a tuner section 102, a demodulation section 103, and a transport stream (TS) separating section 105, an audio signal decoding section 106, a video signal demodulation section 107, a data signal processing section 108, and recording format selection section 116. When contents of a broadcast are scrambled, the portable telephone with broadcast receiving function 100 can be additionally provided with a descrambler 104 for descrambling the scrambled contents, as required.

The section for processing a signal, such as the control section 112, the recording format selection section 116, a replay section 118, and a deleting section 119, can be integrated as a single microcomputer or the like.

Individual constituent sections of the common section will be described.

The control section 112 is implemented by use of, e.g., a microcomputer, and performs control processing for a portable telephone and control processing for a digital broadcast receiving apparatus, in accordance with various programs stored in the ROM 122. The RAM 121 temporarily stores various sets of data used for processing performed by the control section 112.

As mentioned above, the control section of the portable telephone and the control section of the digital broadcast receiving apparatus can share the control section 112, the RAM 121, and the ROM 122.

The operation section 115 is also configured to enable both an operation performed when the portable telephone is used as a mobile telephone and an operation performed when the portable telephone is used as a digital broadcast receiving apparatus.

Elements used as the portable telephone include a ten-key numerical pad, function keys, various select buttons, and the like. When the portable telephone has the camera section 126, the elements include a camera operation switch, and the like.

Elements used as the digital broadcast receiving apparatus include operation switches to be used for tuning; selection of an object to be recorded in the recording section 117 by the recording format selection section 116, i.e., selection of an audio signal, a video signal, a data signal, or a combination thereof; a recording start time and a recording end time; a command for deleting recorded information, and the like. The ten-key numerical pads and the function keys can be used in dual with various select buttons described above.

The display section 109 is, e.g., a liquid-crystal indicator widely used in a portable telephone. In addition to being used as a display section of the portable telephone, the display section is used also as a display section of the digital broadcast receiving apparatus.

Example displays are illustrated in FIGS. 5 through 8, and their details will be described later.

Likewise, the speaker 110 also functions as an audio signal output section of the portable telephone and an audio signal output section of the digital broadcast receiving apparatus, as well.

The term "audio signal" used herein means "sound signal," which encompasses voice and various sounds in a broad sense.

The recording section 117 is, e.g., built-in or removable (replaceable) memory using nonvolatile memory. In addition to being used as a recording section of a digital broadcast receiving apparatus, the recording section can be used (shared) for saving images captured by the camera section 126 of the portable telephone, telephone directory data required for a telephone, incoming call sound data required to notify an incoming call or the like, electronic mail data, data received from a radio communication network by a radio section, and the like.

Operation of the Portable Telephone

Basic operation performed when the portable telephone 100 with broadcast receiving function is used as a portable telephone will now be described.

For instance, when an ordinary conversation with a party on the other end of the portable telephone or exchange of electronic mail are carried out, the portable telephone antenna 113, the radio communication section 114, the operation section 115, the MIC 111, the speaker 110, the display section 109, the control section 112, the RAM 121, and the ROM 122 operate.

Further, when data are downloaded from a provider by Internet and the data are saved, the recording section 117 operates, as well.

When the digital broadcast receiving apparatus is inoperative, the control section 112 attempts to save power by deactivating the power of the section related to the digital broadcast receiving apparatus.

When the user initiates a call to the number of the portable telephone of the other end of the phone by use of the operation section 115 at the time of making a phone call, the portable telephone is connected to a base station by radio by the radio communication section 114 and the portable telephone antenna 113 under control of the control section 112. The portable telephone is connected to a telephone (including a portable telephone) of the other end (a called party), so that the user can carry out a telephone conversation by use of the MIC 111 and the speaker 110.

Operation details of the operation section 115, a conversation status, and the like are displayed on the display section 109 under control of the control section 112.

Further, when data are downloaded from a provider by Internet and stored into the recording section 117, radio communication can be established by the portable telephone antenna 113 and the radio communication section 114; the thus-acquired data can be saved in the recording section 117 by the control section 112; and the thus-stored data can be displayed on the display section 109 by the control section 112.

When the portable telephone is used as a camera, the above-described camera section 126 is operated.

Results of photographing can be retained in the recording section 117. Specifically, when the portable telephone 100 with broadcast receiving function is used, the images captured by the camera section 126 can be retained in the recording section 117. Thus, the portable telephone can be equipped with the function of the digital camera.

Operation of the Digital Broadcast Receiving Apparatus

The digital broadcast receiving antenna 101 continuously receives a digital broadcast. The tuner section 102 selects a channel, which has been selected by the operation section 115 and commanded by the control section 112, and outputs contents of a broadcast of the selected channel; namely, a transport stream (TS), to the demodulation section 103.

The demodulation section 103 demodulates a transport stream (TS) of the selected channel.

When the demodulated transport stream (TS) is scrambled, the descrambler 104 descrambles the scrambled transport stream.

Specifically, the descrambler 104 allows only a specific digital broadcast receiving apparatus to replay (decodes a broadcast being scrambled in a limited receiving format). When the transport stream (TS) is scrambled, the descrambler 104 performs descrambling operation complying with a scrambling scheme under a command from the control section 112.

As an exemplified TS is diagrammatically illustrated in FIG. 2, an audio signal, a video signal, a data signal, and program information are multiplexed into the transport stream (TS) on a per-packet basis.

For instance, the audio signal and the video signal are compressed and encoded by the MPEG scheme.

The transport stream (TS) signal is separated by the TS separating section 105 into a video signal, an audio signal (audio/sound signal), a data signal, and program information, on a per-packet basis.

The thus-separated video signal is decoded by the video signal decoding section 107 in, e.g., an MPEG scheme, and displayed as a video on the display section 109.

The thus-separated audio signal is decoded in, e.g., an MPEG scheme by the audio signal decoding section 106 and output as a voice and/or sound from the speaker 110.

The data signal processing section 108 analyzes the contents of the separated data signal. When the contents of the data signal are related to a broadcast service, the signal is decoded so as to be displayed or replayed on the display section 109, whereby the signal is displayed or replayed.

Recording Performed by the Digital Broadcast Receiving Apparatus

There will now be described a case where the digital broadcast receiving apparatus of the portable telephone 100 with broadcast receiving function is used as a digital broadcast recorder.

The recording section 117 incorporated into the portable telephone 100 with broadcast receiving function is of two types; namely, a fixed built-in type which cannot be removed for replacement, and a freely-removable and replaceable type. In the present embodiment, the recording section may be of either type. The following illustrates a case where non-volatile memory of replaceable card type is used as the recording section 117.

The kinds of programs of the broadcasts are diversified such as sports, music, dramas, movies, news, variety shows, animation, and the like. In some programs, such as movies, dramas, and animation, the thread of a narrative is lost unless the program is viewed continuously. However, in some other programs, such as sports or news, events in progress may be omitted, so long as the user can view only the result of a sporting competition or news.

In the broadcast program such as a sports program, even when the game is not continuously viewed from the beginning to the end over a long period of time, the majority of an audience will be satisfied, so long as only the result of the game is ascertained. Conversely, when the result cannot be recorded, there are many cases where a failure to record the result will induce great dissatisfaction.

Thus as previously mentioned, the programs are divided, according to the kinds of the broadcasts, into programs which require recording of all contents and programs which do not require recording of all contents.

When data are broadcast simultaneously with videos and audio, data serve as a complement to audio, e.g., a progress of points scored in a broadcast of a baseball game, or the like. Therefore, in relation to a data broadcast, there is no necessity for continuously recording the broadcasted data signal into the recording section 117.

In the broadcast of a music program, when recorded music is listened to later, there is a conceivable case where the video showing a performance of playing the music is not necessarily required.

As above, according to the type of programs of the broadcasts, the programs are divided into a program that requires recording of the entire broadcast and a program that does not require recording of the entire broadcast, as mentioned previously.

In view of the above circumstances, in the present embodiment, the recording format selection section 116 is provided so as to enable selection of a format for recording data in the recording section 117 according to the user's desire and objective. Needless to say, all signals can be recorded as usual.

FIGS. 3(*a*) to 3(*d*) illustrate an example display provided on the display section 109. FIGS. 3(*a*) to 3(*d*) show an example service of a digital broadcast of the present embodiment.

FIG. 3(*a*) shows the concept of a broadcast of a baseball game. An area 201 used for displaying a video, and an area 202 used for displaying data that represents a progress in the game or the like which is simultaneously sent, are displayed in a split manner on a display screen 200 of the display section 109.

In this case, specifics of the data are information complementing the broadcast program of the baseball game and are displayed in synchronism with a progress status in the program.

FIG. 3(*b*) shows the concept of a broadcast of a music program. A video is displayed in the area 211 where a video is to be displayed, in synchronism with the video, the name of an artist who is now performing and the title of a song are displayed as text data in an area 212 where data are to be displayed. The data signal of this case is also information which complements the program and, therefore, is displayed in synchronism with a progress status in the music program.

FIG. 3(*c*) shows the concept of a broadcast of a weather forecast program. A video is displayed in an area 221 where a video is to be displayed, and weather forecast data are displayed as text data in an area 222 where data are to be displayed.

Specifics of the data employed in this case are not necessarily synchronised with a progress in the weather forecast program. Since the weather forecast data are independent information, nationwide weather forecast data may be received at one time and displayed as text data.

FIG. 3(*d*) shows the concept of broadcast of a news program. A video which is currently being explained is displayed in an area 231, and a list of news to be broadcast in the news program are displayed in an area 232 where data are to be displayed. Specifics of the data employed in this case are not necessarily synchronized with a progress in the program. Since the data are independent information, the data may be displayed before a newscaster reports news.

As mentioned above, in the exemplifications shown in FIGS. 3(*a*) to 3(*d*), a video output from the video signal decoding section 107 is displayed in an upper half area of the display section 109, and data output from the data signal processing section 108 are displayed in a lower half area of the same.

In the digital broadcast, the data signal can be broadly divided broad in two categories; namely, (1) a data signal relevant to a broadcast service which is now being viewed and (2) a data signal for other cases; e.g., a data signal pertaining to a functional service, such as a download for updating software of a digital broadcast receiving apparatus.

A case of the data signal of the functional service is not limited to the above, but operation is performed according to a designated content.

The data signal of a broadcast service includes character information, graphical information, a stationary image, a motion picture, voice, or the like. In the data signal processing section 100, the signal is decoded by appropriate decoding section.

FIGS. 4(*a*) to 4(*d*) show example signals selected from the transport stream (TS) signal. FIG. 4(*a*) shows a case where only a data signal is selected and recorded in the recording section 117. FIG. 4(*b*) shows a case where the selected audio signal and the selected data signal are recorded as separated files (an audio file and a data file). FIG. 4(*d*) shows a case where the selected audio signal and the selected data signal are stored as one file.

The cases will be described specifically in association with embodiments of the present invention.

First Example

An example shown in FIG. 4(*a*) shows an example where only a data signal is recorded by a transport stream (TS) via a filter which is designated so as to select and output only the data signal.

Second Example

An example shown in FIG. 4(*c*) shows an example where only an audio signal and a data signal are replayed from the recorded transport stream (TS) by the filter designated so as to select and output only the audio signal and the data signal.

Although the audio signal is output in real time, the data signal is configured from a plurality of packets (signals) as one configuration, and hence required packets (signals) are displayed all together.

Third Example

FIG. 4(*b*) shows an example where respective signals are recorded into respective files from the transport stream (TS) included in a broadcast wave. The files are saved while being associated with each other. When one file is designated, the other file can also be replayed.

Fourth Example

An example shown in FIG. 4(*d*) shows an example where a data signal and an audio signal are recorded, as a file (of a transport format) formed from a data signal and a audio signal, from the transport stream (TS) included in a broadcast wave by a filter designated so as to select and output only a data signal and an audio signal.

Fifth Example

The files shown in FIGS. 4(*b*), 4(*d*) can be used for replaying or deleting the designated signal in embodiments to be described later.

Sixth Example

Even when the video signal is compatible with multi-channel (multi angle) broadcasting and a plurality of video signals are recorded, the signal can be replayed or deleted by designating a channel. Further, in relation to a sub-audio, replay or deletion of only a sub-audio signal its the same as that mentioned previously.

In the above example, control information or the like is omitted.

Specific recording operation will now be described.

The user designates, by use of the operation section 115, a channel; a recording start time and a recording end time; an object (format) to be recorded; and a recording format such as only a video signal, only an audio signal, only a data signal, or a combination of a video signal, an audio signal, and a data signal.

These specifics are stored in the recording section 117. The recording start time and the recording end time can be, for example, a duration from a time designated as a start by the user until a time designated as an end by the user.

Further, the time may be determined by selecting a program.

The control section 112 and the recording format selection section 116 cooperate, the tuner section 102 selects a channel in accordance with the designated recording format. In connection with specifics of the broadcast of the channel selected by the tuner section 102, any one or a combination of the audio signal, the video signal, and the data signal, which are separated by the TS separating section 105, is selected; and the thus-selected signal is recorded in the recording section 117.

Specifically, when the user has selected and recorded any one of the video signal, the audio signal, and the data signal in connection with the broadcast program of the selected channel operating the operation section 115, the control section 112 detects specific selecting operations and sets the thus-selected specifics into the recording format selection section 116.

The recording format selection section 116 writes the selected specifics (a video signal, an audio signal, or a data signal) into the recording section 117 on, e.g., a per-packet basis, by cooperating with the control section 112.

Thereby, the signal of the selected type can be recorded into the recording section 117 on a per-packet basis.

In the present embodiment, the signal to be recorded in the recording section 117 is a signal of a received form (when the signal is selected, an unnecessary signal is eliminated). Hence, load imposed on the recording operation performed by the recording section 117 becomes small.

Alternatively, recording is performed by time-multiplexing, and hence signals can be selected individually.

When semiconductor memory, such as commonly-used nonvolatile memory, is used as the recording section 117, a large quantity of electric current is consumed when access is made to the data. Power consumption is also diminished by reducing the amount of data to be recorded. Consequently, the life of the battery of the portable telephone 100 with broadcast receiving function is also prolonged.

Replay Performed by the Digital Broadcast Receiving Apparatus

Replay process will now be described.

First will be described common processing performed when the data recorded in the recording section 117 are replayed.

During replay process, the replay section 118 performs the following processing by cooperation with the control section 112.

Specifically, in accordance with the command from the user to the operation section 115, the replay section 118 displays on the display section 109 the history list of data recorded in the recording section 117. At this time, the replay section 118 displays on the display section 109 a record list of the data recorded in the recording section 117.

At the time of this display, when all the history list cannot be displayed by one operation because of restrictions on the size of the screen of the display section 109, the display is provided through scroll processing.

The user selects desired data from the list displayed on the display section 109.

The replay section 118 reads the selected data from the recording section 117, and output a video signal to the video signal decoding section 107, an audio signal to the audio signal decoding section 106, and a data signal to the data signal processing section 108.

Through foregoing processing, a signal desired by the user, from among the signals recorded in the recording section 117, is output from the display section 109 and the speaker 110.

In connection with the data written in the recording section 117, there will now be described processing for a case where a specific signal is selected from among various signals and the thus-selected file is replayed.

The replay section 118 corresponds to an embodiment of the designating section and the replay section of the present invention.

Specifically, the replay section 110 has a filter function for designating a signal and a replaying function for replaying a designated signal. These functions correspond to the designating section and the replay section of the present invention.

As mentioned previously, data pertaining to an audio signal, a video signal, and a data signal, which are generated by subjecting a transport stream (TS) signal to TS separation, are recorded in the recording section 117.

When only the data signal of these signals is replayed, the control section 112 designates only the data signal. In response to designation of the signal, the replay section 118 scans the signals recorded in the recording section 117, to thus extract only the data signal.

In accordance with the user's operation performed by the operation section 115, the control section 112 may command the replay section 118 to designate a specific signal, or a recorded time can be designated to thus extract only a data signal within the range of the designated time.

The control section 112 controls the thus-extracted data signal such that the data signal is displayed on the display section 109 by the data signal processing section 108.

Figure 5A:
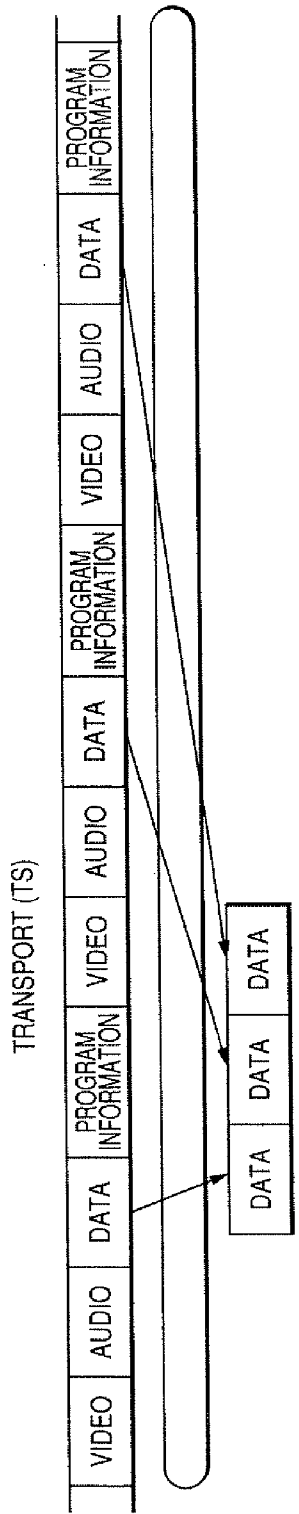
FIG. 5 is a view for describing a replay process of an embodiment, wherein (a) shows a process of extracting data, and (b) and (c) show examples of a display of a digital broadcast service.
Figure 5B:
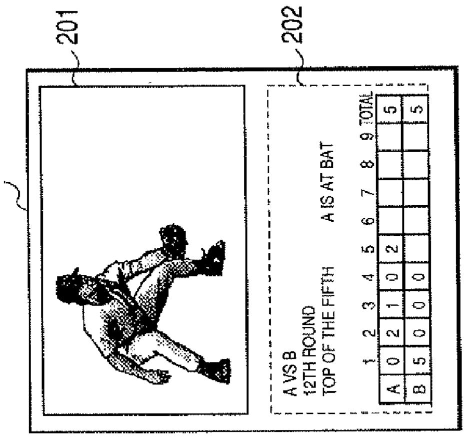
Figure 5C:
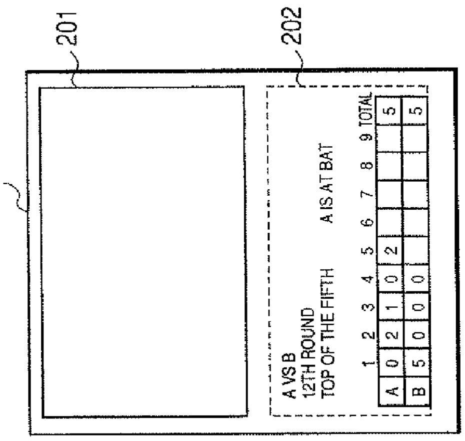

FIG. 5 is a view illustrating processing of the replay section 118 of the present embodiment. FIG. 5(*a*) shows processing for extracting a data signal, and FIG. 5(*b*) shows an example display of a digital broadcast service.

FIG. 5(*b*) shows the concept of a broadcast of a baseball game program. The area 201 displaying a video and the area 202 displaying data which are sent along with the video and which represent data indicating a progress in the game or the like are displayed in a split manner in the display screen 200 of the display section 109. In this case, specifics of the data are information that complements the broadcast of a baseball program and are displayed in synchronism with a progress in the program, Operation performed when only a data signal is replayed from data (a program) recorded in the recording section 117 will now be described.

When the user has performed operation for replaying data (a program) recorded in the recording section 117, the replay section 118 scans the transport stream (TS) signal recorded in the recording section 117 at a predetermined timing corresponding to a progress in the program, as shown in FIG. 5(*c*), thereby extracting only the data signal from among the video signal, the audio signal, the data signal, and program information.

The control section 112 controls the extracted data signal such that the data signal is displayed on the area 202 in the display section 109 through the data signal processing section 108. The area 201 may be any display, such as a standby screen of a portable telephone.

Although there has been described the case where only the data signal is extracted by association with FIG. 5, extracting a data signal is a mere example. Needless to say, the video signal and the audio signal can be extracted.

As above, according to the portable telephone 100 having a broadcasting receiver function of the present embodiment, low power consumption and replay complying with the user's desire can be achieved.

Consequently, in accordance with specifics of a program or the like, it is possible to specify and replay only a required signal. Therefore, the portable telephone can be used in consideration of the status of the user during replay and the remaining quantity of a battery. Designating and replaying the data signal are suitable when results are ascertained from the broadcast of the sport program, which utilizes the data signal as complement information.

Second Embodiment

A second embodiment or the digital broadcast receiving apparatus of the present invention will now be described.

In the present embodiment, there will be described processing for a case where two specific signals are selected from various signals in connection with the data written in the recording section 117 and the thus-selected signals are replayed.

Specifically, in relation to the portable telephone 100 with broadcast receiving function or the first embodiment, there has been described a case where only a single signal is extracted from the recording section 117 and replayed. However, in relation to the portable telephone 100 with broadcast receiving function of the second embodiment, there will now be described processing performed in a case where, e.g., an audio signal and a data signal, are selected as two specific signals and replayed.

Data pertaining to the audio signal, the video signal, and the data signal, which are generated by subjecting the transport stream (TS) signal to TS separation, are recorded in the recording section 117. For instance, when the audio signal and the data signal are replayed from these signals, the control section 112 first designates the audio signal and the data signal. In response to specification of the signals, the replay section 110 scans the signals recorded in the recording section 117 to thus extract the audio signal and the data signal.

In accordance with an operation performed by the user by the operation section 115, the control section 112 may command the replay section 118 to designate a signal, or a recorded time can be designated to thus extract an audio signal and a data signal within the range of the designated time.

The control section 112 performs control operation such that the extracted audio signal is output from the speaker 110 by the audio signal decoding section 106 and such that the extracted data signal is displayed on the display section 109 by the data signal processing section 108.

At that time, the data signal forms a single display screen by a predetermined number of packets. Hence, after a predetermined number of packets have been extracted to thus acquire information corresponding to one screen, the control section 112 controls the display section 109, to thereby display data corresponding to one screen.

Figure 6A:
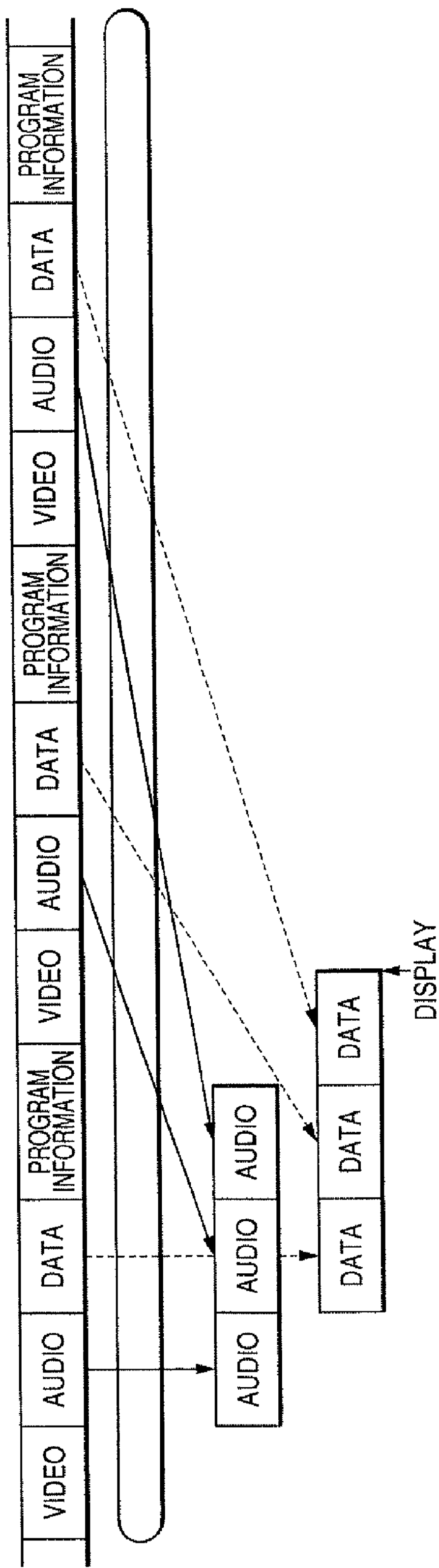
FIG. 6 is a view for describing a replay process of an embodiment, wherein (a) shows a process of extracting data, and (b) and (c) show examples of a display of a digital broadcast service.
Figure 6B:
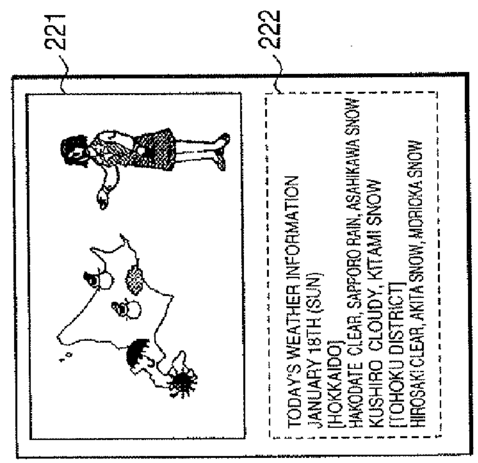
Figure 6C:
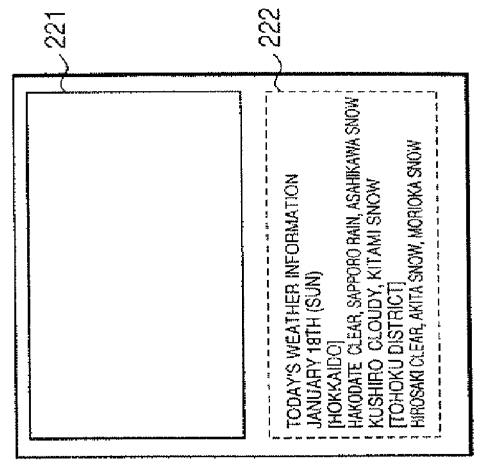

FIG. 6 is a view illustrating processing of the replay section 118 of the present embodiment. FIG. 6(*a*) shows processing for extracting an audio signal and a data signal, and FIG. 6(*b*) shows an example digital broadcast service.

FIG. 6(*b*) shows the concept of a broadcast of a weather forecast program. Weather forecast information is displayed by displaying a video in the area 221 where a video is to be displayed and text data in the area 222 where data are to be displayed.

Specifics of the data employed in this case are not necessarily synchronized with a progress in the weather forecast program. Since the data are independent information, nationwide weather forecast data may be received at one time and displayed as text data.

There will now be described processing for a case where only an audio signal and a data signal are replayed from the data (a program) recorded in the recording section 117.

When the user has performed operation for replaying data (a program) recorded in the recording section 117, the replay section 118 scans the transport stream (TS) signal recorded in the recording section 117 to thus extract an audio signal and a data signal from the video signal, the audio signal, the data signal, and program information, as shown in FIG. 6(*a*).

The control section 112 performs control operation such that the thus-extracted audio signal is output from the speaker 110 by the audio signal decoding section 106 and such that the data signal is displayed in the area 222 of the display section 109 by the data signal processing section 108.

Consequently, as shown in FIG. 6(*c*), the extracted data signal is displayed in the area 222 of the display section 109.

At that time, the data signal shown in FIG. 6(*c*) is configured such that one screen is displayed by data corresponding to three packets. After the data signal corresponding to three packets have been extracted, a video is displayed.

The area 221 may be any display, such as a standby screen of a portable telephone.

There have been described a case where the audio signal and the data signal are extracted in association with FIG. 6. Extracting the audio signal and the data signal is an example. Needless to say, other signals can be extracted in combination.

As mentioned above, according to the portable telephone 100 with broadcast receiving function of the present embodiment, two specific signals can be designated from among the plurality of signals obtained by separating the recorded transport stream (TS) signal, and the thus-designated signals can then be replayed.

Consequently, only the required data can be designated and replayed according to specifics of the program or the like. Hence, the portable telephone can be used in consideration of the condition of the user during replaying operation, the remaining quantity of a battery, and the like.

Designated extraction of an audio signal and a data signal is suitable for a weather forecast program, or the like, which does not need to effect synchronization with the replayed signal.

Third Embodiment

There will now be provided descriptions by taking, as an example, a recording section for storing files according to the type of data (e.g., a folder), of the portable telephone sharing the recording section.

The portable telephone 100 with broadcast receiving function of the present embodiment records the audio signal, the video signal, and the data signal, all of which are included in the transport stream (TS) signal, as different files. The user individually designates the files later, to thus attempt to replay the data.

Specifically, the TS separating section 105 separates the transport stream (TS) signal into the audio signal, the video signal, and the data signal. The control section 112 generates a file for each of the separated signals.

Further, the control section 112 records the thus-generated files into the recording section 117.

At that time, the thus-generated files are recorded in the recording section 117 in an associated manner. For instance, if the file corresponds to the data obtained from the broadcast of a music program, the file of the video signal, the file of the audio signal, and the file of the data signal are recorded in an associated manner.

Individual files recorded in the recording section 117 or all related files recorded in the recording section 117 can be replayed by a user designating the files by the operation section 115.

Specifically, the control section 112 notifies of the file designated by the user to the replay section 118. In response to the notification, the replay section 118 fetches the designated file from the recording section 117 and replays the file.

FIG. 7 is a view illustrating processing of the replay section 118 of the present embodiment. FIG. 7(*a*) shows file generation processing, and FIG. 7(*b*) shows an example display of a digital broadcast service.

FIG. 7(*b*) is the concept of a broadcast of the music program. A video is displayed in the area 211 where a video is to be displayed. In synchronism with the video, the name of an artist who is now performing and the title of a song are displayed as text data in the area 212 where data are to be displayed.

In this case, the data signal is information which complements the program and, therefore, is displayed in synchronism with a progress in the music program.

There will now be described a process for recording files in the recording section 117 from the transport stream included in the broadcast wave.

As shown in FIG. 7(*a*), in the portable telephone 100 with broadcast receiving function of the present embodiment, the TS separating section 105 separates the transport stream (TS) signal into an audio signal, a video signal, and a data signal, and the control section 112 generates a file for each of the separated signals.

In the embodiment shown in FIG. 7(*a*), a file of the audio signal and a file of the data signal are generated.

These files are recorded in an associated manner in the recording section 117.

Subsequently, when the user has designated a file by the operation section 115, the control section 112 notifies of the file designated by the user to the replay section 118. In response to this notification, the replay section 118 fetches the designated file from the recording section 117 and replays the file.

Specifically, if the file is an audio, corresponding audio is output from the speaker 110. If the file is a data file of a data broadcast, corresponding data are displayed in the area 212 of the display section 109.

As mentioned above, according to the portable telephone 100 with broadcast receiving function of the present embodiment, files are generated from a plurality of signals which are obtained by separating the received transport stream (TS) signal. The user can individually replay the thus-generated files later.

Consequently, the user can later replay (listen to) the audio signal and the data signal pertaining to the broadcast of a music program which does not necessarily require a video display. Needless to say, at that time, only the file of the audio signal can be designated at that time.

Fourth Embodiment

Descriptions of the portable telephone 100 with broadcast receiving function of the first embodiment have mentioned processing for recording in the recording section 117 the audio signal, the video signal, and the data signal included in the transport stream (TS) signal. Of these recorded signals, a specific signal can be selected and deleted.

Consequently, the recording capacity in the recording section 117 can be utilized to the greatest extent.

Specifically, in order to delete the data recorded in the recording section 117, the deleting section 119 is used.

The deleting section 119 performs processing provided below in cooperation with the control section 112.

Specifically, when the user has displayed, on the display section 109, the history list of the data signal recorded in the recording section 117 by use of the operation section 115, the deleting section 119 displays the record list recorded in the recording section 117 on the display section 109. When not all the history list can be displayed by one operation during the display for reasons of restrictions on the screen size of the display section 109, the list is displayed through scroll processing.

The user selects, from the list displayed on the display section 109, a signal which the user desires to delete.

The deleting section 119 performs processing for deleting the selected signal from the recording section 117, and the area from which the file has been deleted is set as a recordable area.

The deleting section 119 is an embodiment of the deleting section of the present invention.

Figure 8A:
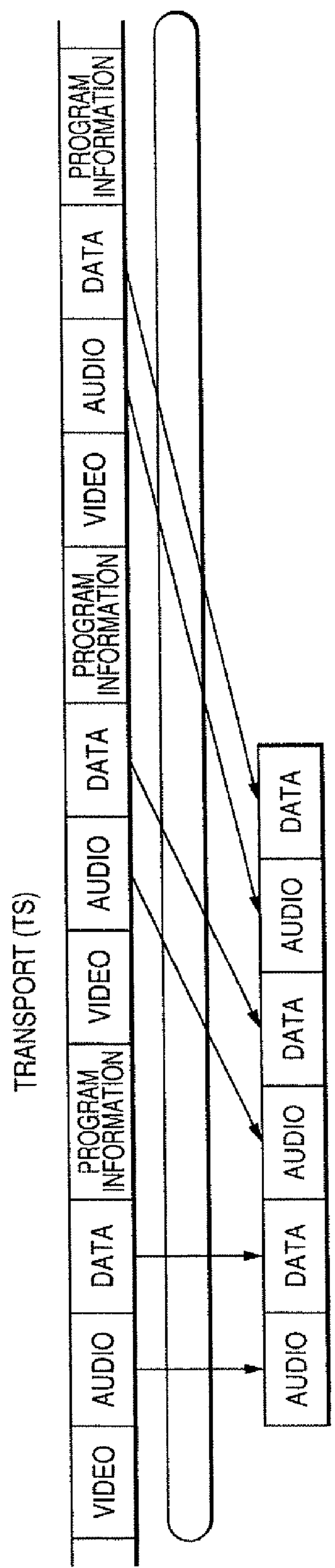
FIG. 8 is a view for describing a deletion process of an embodiment, wherein (a) shows a deletion process, and (b) shows an example of display of a digital broadcast service.
Figure 8B:
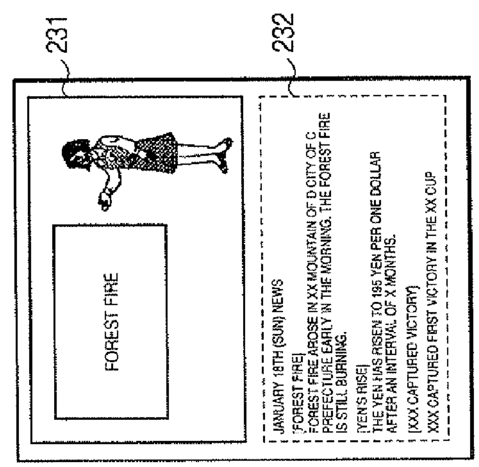
Figure 9:
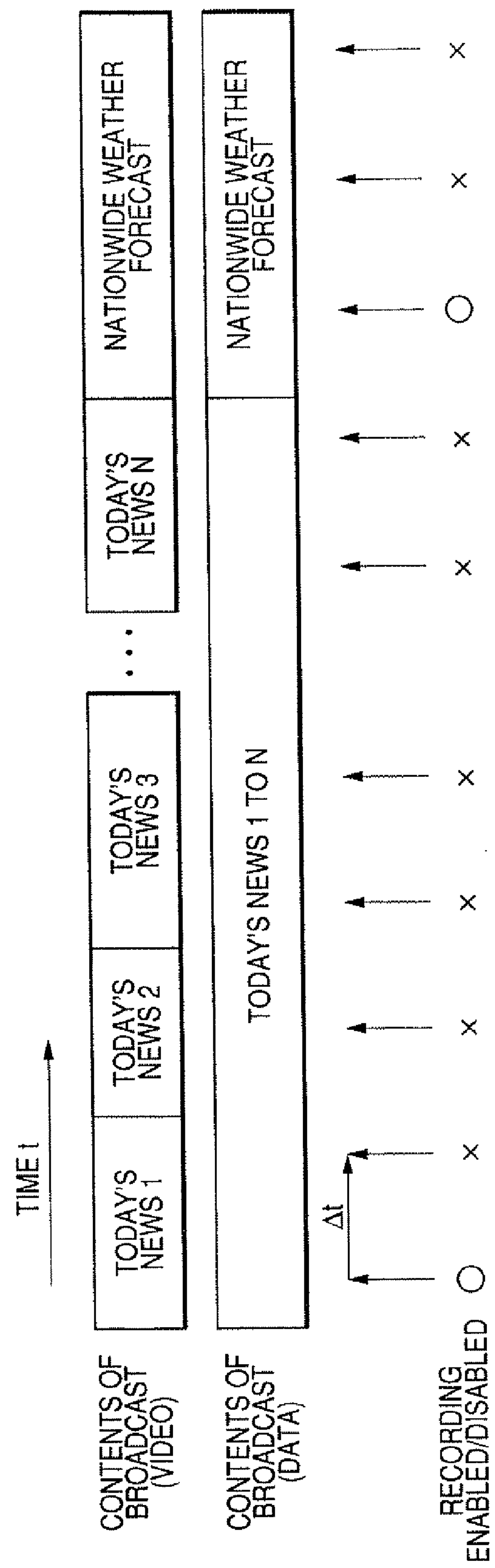
FIG. 9 is a view for describing operation for intermittently receiving and recording a broadcast program, in a portable telephone with broadcast receiving function according to a second embodiment of the present invention.

FIG. 8 is a view for describing deletion process of the present embodiment. FIG. 9(*a*) shows processing of the deleting section 119, and FIG. 8(*b*) shows an example service of a digital broadcast.

FIG. 8(*b*) shows the concept of a broadcast of a news program. A video which is currently being described is displayed in the area 231. A list of news items to be broadcast in the news program is displayed in the area 232 where data are to be displayed.

Specifics of the data employed in this case are not necessarily synchronized with a progress status. Since the data are independent information, the data may be displayed before the newscaster explains news.

In relation to such a news program, there are many cases where a sufficient information transmission function is exhibited even though there is no video signal, so long as an audio signal and a data signal are available. Consequently, a video signal requiring large recording capacity is deleted and a corresponding storage area is released for another use, so that the recording section 117 can be effectively utilized.

Consequently, according to the portable telephone 100 with broadcast receiving function of the present embodiment, only the video signal is selected from the transport stream (TS) signal corresponding to the data (program) recorded in the recording section 117, as shown in FIG. 8(*a*), whereby there is yielded an advantage of ensuring greater recording capacity.

Another signal as well as the video signal can be deleted. Deleting a video signal, which requires a great recording area, is most desirable for the recording section 117.

Even when data are not designated, a configuration can also be made so as to automatically delete data pertaining to information requiring immediacy or information having an expiration date, ouch as news, after elapse of a predetermined period of time.

A configuration may also be made such that data to be recorded in the recording section 117 have previously been classified (prioritized) and such that a data signal of a lower class (or a category) is deleted.

Fifth Embodiment

In the portable telephone 100 with broadcast receiving function of the third embodiment, the audio signal, the video signal, and the data signal, which are included in the transport stream (TS) signal, are recorded in the recording section 117 while being associated with the files. These recorded files cannot be deleted on a per-file basis.

Thereby, the recording capacity in the recording section 117 can be utilized to the greatest extent.

Specifically, in order to delete the files recorded in the recording section 117, the deleting section 119 is used.

The deleting section 119 performs processing, which is provided below, in cooperation with the control section 112.

The user displays, on the display section 109, a history list of the files recorded in the recording section 117 by use of the operation section 115. At this time, the deleting section 119 displays on the display section 109 the record list recorded in the recording section 117.

When not all the history list can be displayed by one operation during the display for reasons of restrictions on the screen size of the display section 109, the list is displayed through scroll processing.

The user selects, from the list displayed on the display section 109, a file which the user desires to delete.

The deleting section 119 performs processing for deleting the selected file from the recording section 117, and the area from which the file has been deleted is set as a recordable area.

For instance, in the case shown in FIG. 7(*a*) in connection with the third embodiment, the file of the audio signal and the file of the data signal are recorded in the recording section 117. However, the user can designate and delete these files.

When the user determines that the data signal is not needed, the user deletes only the file of the data signal, whereby the corresponding recording area can be released.

Consequently, according to the portable telephone 100 with broadcast receiving function of the present embodiment, there is yielded an advantage of the ability to ensure greater recording capacity as in the case of the portable telephone 100 with broadcast receiving function of the fourth embodiment.

Sixth Embodiment

The descriptions of the first through fifth embodiments have described the portable telephone 100 with broadcast receiving function which can perform recording, replaying, or deleting operation on a per-data-unit or per-file-unit basis. Even when the video signal is compatible with a multi-channel (multi-angle) scheme and a plurality of video signals are recorded, recording, replay, or deletion of a file/data can be performed similarly.

Specifically, since the video data per an angle can be separated as separate data in the multi-angle video signal, video data of each angle can be replayed/deleted.

Audio data pertaining to sub-audio can be separated as separate data from audio data pertaining to main audio. Replay/deletion can be limited to only audio data pertaining to sub-audio.

Seventh Embodiment

The user, by use of the operation section 115, designates a channel; a recording start time and a recording end time; an object (format) to be recorded; and a recording format, as illustrated in, e.g., FIG. 4(*a*), such as only a video signal, only an audio signal, only a data signal, or a combination thereof.

These specifics are stored in the recording section 117. The recording start time and the recording end time can be, for example, a duration from a time designated as a start time by the user until a time designated as an end time by the user. As will be described later, a reserved recording time can be used. The reserved recording time may be determined by selecting a program.

In accordance with the recording format designated through format specification, the control section 112 and the recording format selection section 116 cooperate, to thereby cause the tuner section 102 to select a channel. In connection with specifics of the broadcast of the channel selected by the tuner section 102, any one of the audio signal, the video signal, and the data signal separated by the TS separating section 105 or a combination thereof is selected, and the thus-selected signal is recorded in the recording section 117.

Specifically, the user selects any one to be recorded from among the video signal, the audio signal, and the data signal in connection with the program of the selected broadcast by operating the operation section 115. The control section 112 detects details of the selected operation and sets the selected details to the recording format selection section 116.

In cooperation with the control section 112, the recording format selection section 116 writes the selected details (the video signal, the audio signal, and the data signal) into the recording section 117 on, e.g., a per-packet basis.

Thereby, the signal of the type selected by the recording section 117 can be recorded on a per-packet basis.

In the present embodiment, the signal to be recorded in the recording section 117 is of a received signal format as it is (when the signal is selected, an unnecessary signal is eliminated). Hence, load imposed on recording operation performed by the recording section 117 becomes small.

Alternatively, recording is performed by time-multiplexing, and hence signals can be selected individually.

Example storage capacity of the recording section 117 of the present invention will now be described.

For instance, a transport stream (TS) is assumed to be formed from a compressed, encoded audio signal of 96 kbps, a data signal of 32 kbps, and a compressed, encoded video signal of 256 kbps. The transport stream (TS) is assumed to be broadcast as a stream of 384 kbps.

(1) When the program currently being broadcast is a music program and the user desires to record only the compressed, encoded audio signal into the recording section 117, the recording capacity required to temporarily record the same program in the recording section 117 for the same period of time becomes one-quarter of that required to record all the signals in the recording section 117; namely, the compressed, encoded video signal, the compressed, encoded audio signal, and the data signal.

(2) When the user desires to record only topics of a news broadcast acquired at that time in a news program or the like, it is better to record only the data signal into the recording section 117 as illustrated in FIG. 4(*a*). Therefore, the required recording capacity becomes only one-twelfth of that required when all the signals are recorded.

(3) Even when the user desires to record the audio signal and the data signal in the music program, as shown in FIGS. 4(*b*) to 4(*d*), the recording capacity becomes one-third of that required to record all the signals.

As mentioned above, a configuration is arranged such that only a required signal is selected and recorded in the recording section 117, whereby memory capacity can be diminished significantly.

When semiconductor memory, such as commonly-used nonvolatile memory, is used as the recording section 117, a large quantity of electric current is consumed when access is made to the data. As mentioned above, power consumption can be diminished by reducing the volume of recorded data. Consequently, the life of the battery provided in the portable telephone 100 with broadcast receiving function also made longer.

Replay of the Data Recorded in the Digital Broadcast Receiving Apparatus

The replay section 118 is used for replaying the data recorded in the recording section 117. The replay section 118 performs the following processing in cooperation with the control section 112.

The user causes the display section 109 to display the history list of the data recorded in the recording section 117 through use of the operation section 115.

At this time, the replay section 118 displays, on the display section 109, the record list recorded in the recording section 117. At the time of this display, when the entire history list cannot be displayed by one operation because of restrictions on the size of the screen of the display section 109, the display is provided through scroll processing.

The user selects desired data from the list displayed on the display section 109. The replay section 118 reads the selected data from the recording section 117, and outputs a video signal to the video signal decoding section 107, an audio signal to the audio signal decoding section 106, and a data signal to the data signal processing section 108.

Through foregoing processing, a signal desired by the user, from among the signals recorded in the recording section 117, is output from the display section 109 and the speaker 110.

FIGS. 5 to 8 show an example of replaying operation.

Deletion of the Data Recorded in the Digital Broadcast Receiving Apparatus

In order to delete the data recorded in the recording section 117, the deleting section 119 is used.

The deleting section 119 performs processing provided below in cooperation with the control section 112.

The user causes the display section 109 to display the history list of the data signal recorded in the recording section 117 by use of the operation section 115. At this time, the deleting section 119 displays, on the display section 109, the record list recorded in the recording section 117. At the time of this display, when all the history list cannot be displayed by one operation because of restrictions on the size of the screen of the display section 109, the display is provided through scroll processing.

The user selects a signal to be deleted from the list displayed on the display section 109.

The deleting section 119 performs processing for deleting the selected signal from the recording section 117, and the area from which the file has been deleted is set as a recordable area.

Automatic Deletion of the Data Recorded in the Digital Broadcast Receiving Apparatus In addition to above deleting operation, data requiring immediacy or an expiration date, such as news, can be automatically deleted after elapse of a predetermined period of time.

Prioritized Deletion of the Data Recorded in the Digital Broadcast Receiving Apparatus Data to be recorded in the recording section 117 have previously been classified (prioritized). When the amount recorded in the recording section 117 has become deficient, the recording format selection section 116 commands the deleting section 119 to delete the signal of lower class (may be a category). After an area to be recorded in the recording section 117 has been ensured by the deleting section 119, the signal selected by the recording format selection section 116 can be recorded.

When the recording format selection section 116 has been ensured a recording area in the recording section 117, the above described signal recording processing is performed.

The respective sections which perform signal processing, such as the control section 112, the recording format selection section 116, the replay section 118, and the deleting section 119, can be configured integrally by a single microcomputer.

As mentioned above, according to the seventh embodiment of the selective recording format of the present invention, there can be embodied a digital broadcast receiving apparatus which can reduce power consumption and curtail the storage capacity of the recording section 117.

Therefore, the digital broadcast receiving apparatus of the present invention its more compact and lighter in weight; exhibits superior portability and compatibility in terms of integration with the portable telephone; and yields an advantage of being applied to a mobile device.

Consequently, convenience and utilization of resources are more enhanced as a result of the digital broadcast receiving apparatus being incorporated into the portable telephone.

Eighth Embodiment of Selective Recording Format

An eighth embodiment of the selective recording format in of the present invention will be described by reference to FIG. 9.

FIG. 9 is a timing chart showing an example case where a data broadcast or a news program, such as that shown in FIGS. 3(*c*), (*d*) is intermittently received and recorded.

Since a program, such as a weather forecast, is usually handled as a part of the news program, a broadcast of the type shown in FIG. 9 is achieved.

When receiving operation is performed cyclically, intermittently at an interval of Δt (second), nothing is recorded in the program at the time of first receiving operation. The recording section 117 records all the data signals, which can be displayed in the area 232.

In the case of a broadcast of a news program, an identical data signal is repeatedly broadcast for a given period of time in connection with the data signal that is being broadcast. Therefore, there is no necessity for recording the same data signal into the recording section 117.

In the majority of broadcasts, specifics of the data signal change with progress in a program. Hence, when the user has selected a format for recording only a data signal, such as that shown in FIG. 4(*a*), by the operation section 115, the elements ranging from the tuner section 102 to the TS separating section 105, which receive a digital broadcast, are not necessarily operated at all times. These elements are operated for a given period of time, to thus receive a part of a data signal which can form a display such as characters. The recording format selection section 116 compares the thus-received data signal with the previous data signal recorded in the recording section 117. If any change has arisen in the specifics of the data signal, the changes are recorded in the recording section 117.

As mentioned above, the specifics of the data signal employed for the news program correspond to information which is independent of progress in the program. Therefore, in a second time or a subsequent time, recording operation is performed only when the specifics of the data signal are changed. Although receiving operation is intermittently performed until the next nationwide weather forecast is broadcast, no changes arise in the specifics of the data signal. Hence, operation for recording a data signal into the recording section 117 does not need to be performed.

At a point in time when the nationwide weather forecast is broadcast, specifics of the data signal are also changed. Hence, data which can be displayed in the area 222 are newly recorded.

As above, when the recording format selection section 116 records only the data signal, such as that shown in FIG. 4(*a*), in the recording section 117, the elements from the tuner section 102 to the TS separating section 105 intermittently perform receiving operation. Thus except for the receiving operation, the quantity of electric current consumed by the recording section 117 can be greatly reduced by recording the signal into the recording section 117. Therefore, an attempt can be made to diminish power consumption, and contents of the broadcast can be recorded.

Ninth Embodiment

FIG. 10 is a block diagram of a portable telephone 100A with broadcast receiving function that is embodied as a ninth embodiment of the digital broadcast receiving apparatus of the present invention by providing the portable telephone 100 having the broadcast receiving function illustrated in FIG. 1 with reservation recording setting section.

When compared with the portable telephone 100 with the broadcast receiving function illustrated in FIG. 1, the portable telephone 100A with the broadcast receiving function shown in FIG. 10 is additionally provided with reservation recording setting section 401, program type determination section 402, and electronic program list data 403 recorded in the RAM 121. In other respects, the portable telephone 100A having the broadcast receiving function is identical in configuration with the portable telephone 100 having the broadcast receiving function.

Those areas assigned the same reference numerals as those of the portable telephone 100 having the broadcast receiving function operate in the same manners as do their counterparts in the portable telephone 100 having the broadcast receiving function.

The reservation recording setting section 401 and the program type determination section 402 can also be integrated with the control section 112.

In the portable telephone 100A having the broadcast receiving function, the electronic program list data 403 are assumed to have been previously stored in the RAM 121.

When the user performs reserved recording of a program by operating the operation section 115, the program type determination section 402 checks information about the reserved program against the electronic program list data 403 recorded in the RAM 121 of the portable telephone 100A having the broadcast receiving function. When the type of the program is a program which broadcasts a data signal that is independent of a video such as news or the like or is a program where a data signal is information complementing a program as in the case of a sports program wherein a progress in the program is ascertained by viewing the complement information, settings are made in the reservation recording setting section 401 such that only the data signal is recorded in the recording section 117 as shown in FIG. 4(*a*).

The reservation recording setting section 401 issues a report to the control section 112 when the set time has arrived. The control section 112 reads reserved information from the reservation recording setting section 401; adjusts the tuner section 102 to the reserved program (channel); and commands the recording format selection section 116 to record only the data signal.

Pursuant to the command, the recording format selection section 116 records only the data signal into the recording section 117.

As mentioned above, according to the type of a reserved program, only a data packet is recorded in the recording section 117, so that the amount recorded in the recording section 117 can be curtailed.

When determining whether or not only the data signal is recorded in connection with the reserved sot program, the program type determination section 402 makes a determination by means of major classification by category or intermediate classification by category using a content descriptor as described in, e.g., program layout information used in an ARIB STD D10 digital broadcast, By an example, when major classification by category is "news/press," "sports," "information/tabloid show", or when major classification by category is "hobby/education" and intermediate classification by category is "conversation/language," "infant/elementary school student," "college student/entrance examination," "junior high school student/high school student," and "lifelong education/qualification," use of only data packets is determined to be useful.

In a case where the essential requirement is to be able to ascertain a result, as in a case where major classification by category of a program reserved for recording is "sports" and intermediate classification by category is "baseball," "soccer," "golf," or the like, the data signal is intermittently received as in the case of the digital broadcast receiving apparatus of the second embodiment. Only the result is recorded as a data signal as the final data, whereby power consumption and amount recorded in the recording section 117 can be significantly reduced.

Figure 11:
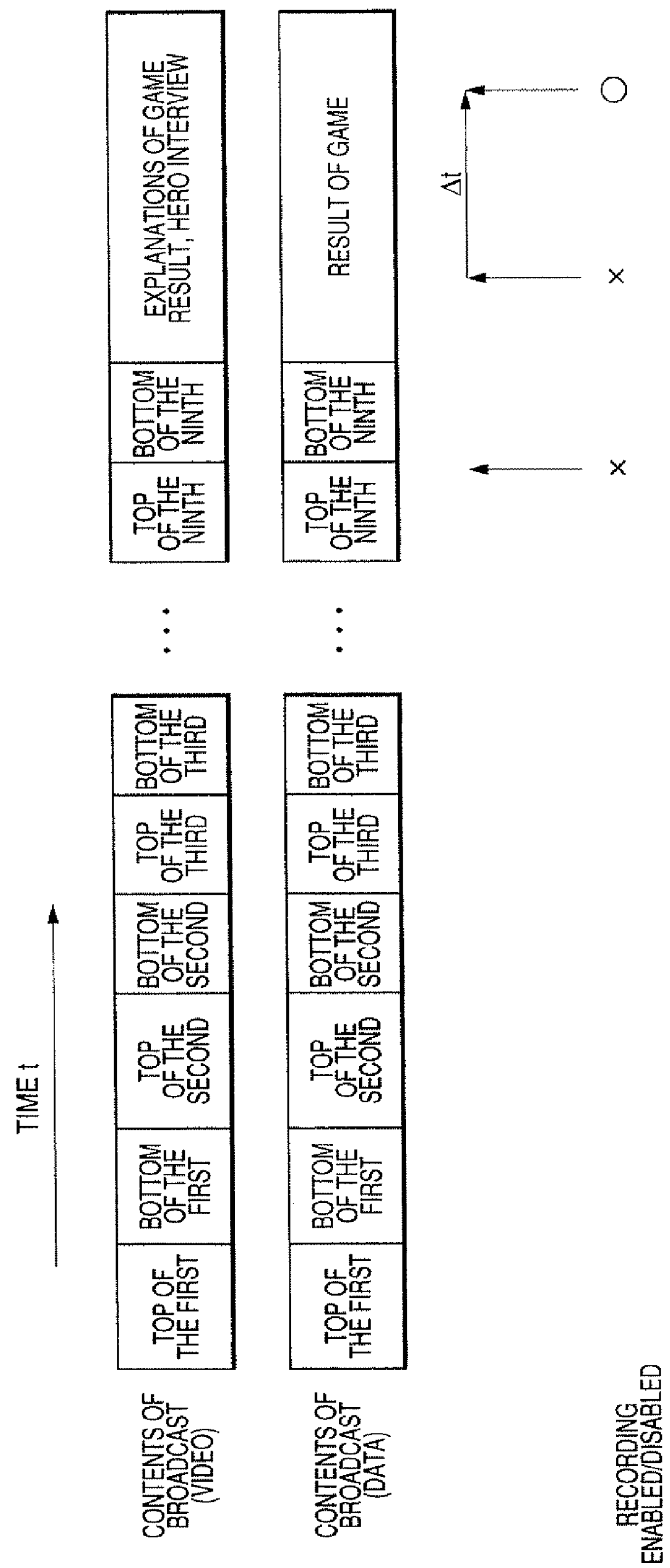
FIG. 11 is a view for describing operation for intermittently receiving and recording a broadcast, in a portable telephone with broadcast receiving function according to a third embodiment of the present invention.
Figure 13:
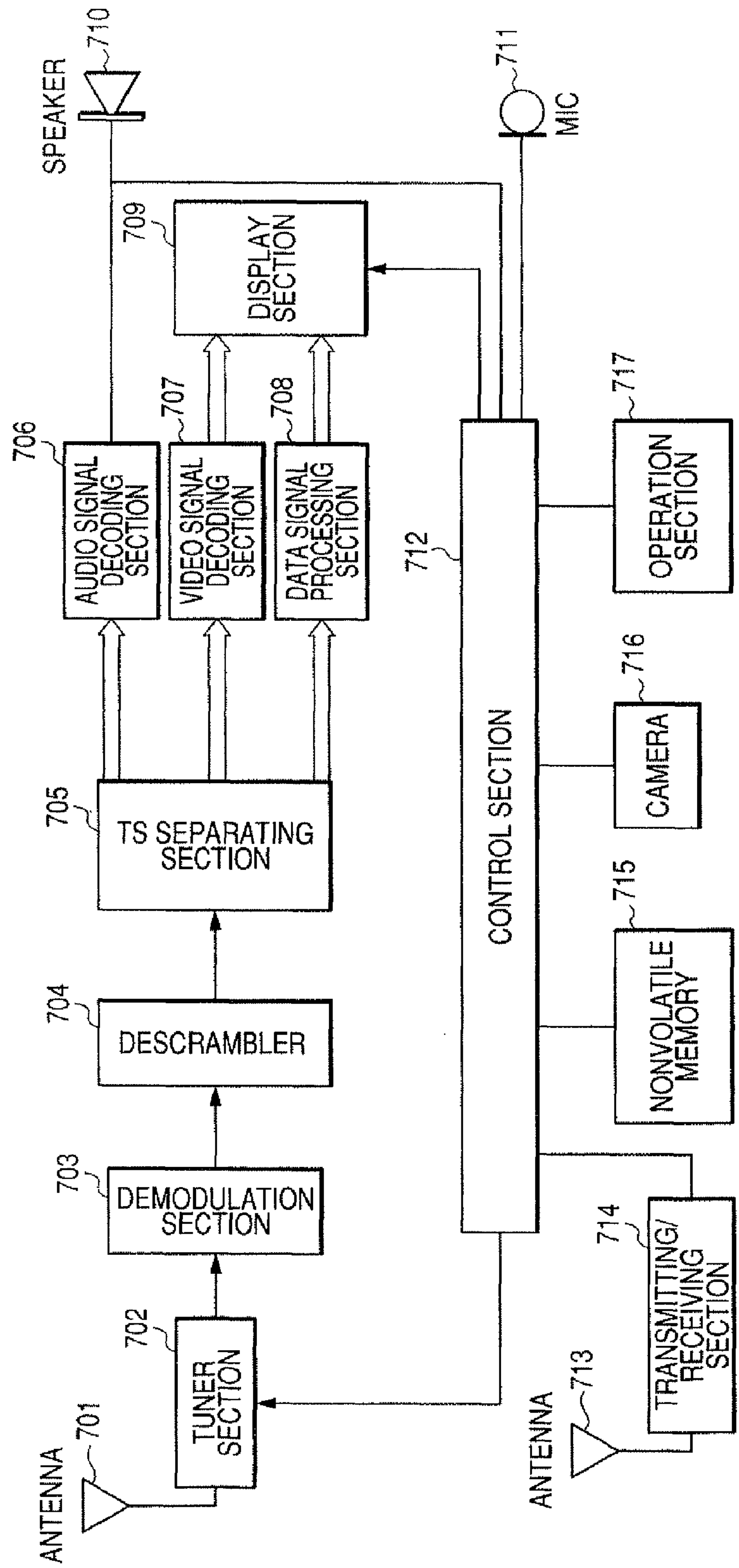
FIG. 13 is a block diagram of a related-art broadcast receiving apparatus.

FIG. 11 shows an example where contents of the broadcast shown in FIG. 3(*a*) are intermittently received and recorded.

In this case, the broadcast time has already becomes ascertained so it is better to start intermittent receiving several minutes before completion of the broadcast end time.

In general, in the case of a sports program, a broadcast is in real time. Hence, there are many cases where the broadcast end time comes before or after the scheduled time.

When a broadcast of a game is completed early, inmost cases a sport commentary of the result of the game and an interview are continuously performed, because of restrictions on the program. Only in very rare cases is the broadcast finished before the schedule. Therefore, it is better to perform intermittent receiving operation several minutes before the broadcast end time until the end of the broadcast.

In the case of a broadcast of a sport, such as a baseball, a soccer, or the like, the majority of sports take one hour or more (the majority of sports take two hours or longer), a large quantity of power is required to receive all the broadcast, which in turn imposes a heavy load on the battery.

As above, when such a broadcast of sports is recorded with the digital broadcast receiving apparatus of the portable telephone 100 with broadcast receiving function, it is indispensable to intermittently receive and record the broadcast immediately before the end of the game (from the neighborhood of the end of the program) in order to reduce the amount recorded and power consumption of the recording section 117.

Tenth Embodiment

FIG. 12 is a block diagram of a portable telephone 100B with broadcast receiving function that is embodied as a tenth embodiment of the digital broadcast receiving apparatus of the present invention by providing the portable telephone 100A having the broadcast receiving function illustrated in FIG. 10 additionally with memory capacity determination section 601 and a recording capacity computing section 602.

In the portable telephone 100B having the broadcast receiving function shown in FIG. 12, those areas assigned the same reference numerals as those of the portable telephone 100A having the broadcast receiving function, which is shown in FIG. 10, function in the same manners as their counterparts of the portable telephone 100A having the broadcast receiving function.

The memory capacity determination section 601 and the recording capacity computing section 602 can also be integrated with the control section 112.

When the user has reserved recording by operating the operation section 115, the recording capacity computing section 602 reads information about the reserved program from the electronic program list data 403 recorded in the RAM 121, and computes the recording capacity required to record the program in the recording section 117.

Since a distribution rate of the digital broadcast is essentially constant for each given broadcast type, the recording capacity computing section 602 can predict storage capacity required to record the information based on the time required for recording operation.

The memory capacity determination section 601 compares the recording capacity predicted by the recording capacity computing section 602 with the remaining capacity of the recording section 117. Even when the user has made settings in order to record all the video signal, the audio signal, and the data signal, when the recording capacity is deficient if the type of the program to be recorded is a program whose essential requirement is to record a progress status, such as a sport program, intermittent receiving is performed several minutes before completion of the broadcast in the same manner as in the case of the previously-described method, to thus record only a data signal. As a result, even when the remaining storage capacity of the recording section 117 is small, recording which yields a desired result can be performed.

Eleventh Embodiment

The descriptions about operations of the portable telephones 100 to 100B having the broadcast receiving function have stated the case where the portable telephone does not operate.

When the portable telephone is set in a power-off state or a phone-answering mode, no contention arises between the display section 109 and the speaker 110, which are shared. Thus no problem is posed.

However, in a state where the portable telephone is set in a standby condition; where the digital broadcast receiving apparatus remains operative; and where the display section 109 and the speaker 110 are used, there is a potential risk of occurrence of contention between the display section 109 and the speaker 110 when there is an incoming call or an electronic mail from any party.

In the eleventh embodiment, a priority level can be set by designation of the user.

The user effects, by the operation section 115, settings in the control section 112 whether the portable telephone is assigned a priority level which is higher than that of the digital broadcast receiving apparatus or the digital broadcast receiving apparatus is assigned a priority level which is higher than that of the portable telephone.

The result of settings is recorded in the RAM 121.

(1) Where the portable telephone is assigned a priority level which is higher than that of the digital broadcast receiving apparatus When an incoming call has arisen in the portable telephone when broadcast contents of a desired channel are viewed by the display section 109 and the speaker 110 using the digital broadcast receiving apparatus and data are being recorded in the recording section 117, the control section 112 causes the display section 109 to display the call of the portable telephone and causes the speaker 110 to issue a ring. When the user brings the portable telephone into an off-hook state, the portable telephone can be used as a telephone by use of the MIC 111.

At this time, the display section 109 and the speaker 110 cannot be used for the digital broadcast receiving apparatus. However, a necessary signal can be recorded in the recording section 117 by the recording format selection section 116.

When the conversation has been finished and the portable telephone has been brought into an on-hook state, the control section 112 brings the portable telephone into a standby condition, to thus restore operation of the digital broadcast receiving apparatus and cause the display section 109 and the speaker 110 to output a replayed video and a replayed sound.

(2) Where the digital broadcast receiving apparatus is assigned a priority level which is higher than that of the portable telephone The control section 112 sends to the base station of the portable telephone a report that the portable telephone cannot be used; e.g., the phone is in a mode corresponding to a power-off state or a phone-answering state.

Broadcast contents of a desired channel are viewed by the display section 109 and the speaker 110 by use of the digital broadcast receiving apparatus. After operation for recording data into the recording section 117 has been completed, the control section 112 ascertains whether or not a call was made, as necessary. If a call had been made, origination of the call is displayed on the display section 109.

(3) When the portable telephone is prioritized according to details of the operation of the digital broadcast receiving apparatus, operation of the portable telephone can be prioritized in accordance with details of operation of the digital broadcast receiving apparatus in addition to (1) and (2).

For instance, in the case of a method for music appreciation or very intense martial arts, break off of the broadcast of music or martial arts, which would otherwise be caused by operation of the portable telephone, is undesirable. In contrast, in the case of a continuous drama, there are many cases where the portable telephone is prioritized.

Consequently, when a reservation is made by utilization of the electronic program list data 403 or the like, an additional remark as to whether the portable telephone or the digital broadcast receiving apparatus is prioritized is recorded in the RAM 121. In accordance with the data recorded in the RAM 121, the control section 112 can select any one from two contending operations (incoming call processing).

In addition to the embodiments provided above, when the sensitivity of a broadcast wave is detected and the sensitivity fails to fulfill a predetermined value (a state where a video or a sound cannot be received stably), the recording format of the data signal may be switched. By this configuration, even when the digital broadcast receiving apparatus is incorporated into a mobile unit and a receiving location (receiving sensitivity) changes moment by moment, minimum required information can be recorded.

Since the data broadcast is a repeated broadcast of the same data, required information can be acquired even when the data are recorded more intermittently than are a video and an audio.

Moreover, the recording section for recording data used for a phone is divided into folders according to the type of data. When the recording section fur recording a broadcast wave doubles as recording section for recording data used for the phone, a file formed by comprising, e.g., a video signal and an audio signal, is recorded in a movie folder. When the video signal is selected and deleted from the file, the resultant file may be moved to the sound folder.

This configuration makes it easy to ascertain which signals are included in the files from which portions have been deleted.

The above described embodiments can also be combined appropriately.

The above embodiment is a mere illustration of the present invention, and the present invention is not limited to the above embodiment.

INDUSTRIAL APPLICABILITY

According to the digital broadcast receiving apparatus of the present invention, a configuration is made such that the recording format complying with contents of the broadcast can be selected by the configurations (1) to (12). Hence, lower power consumption and reduced recording amount can be attained.

Further, according to the digital broadcast receiving apparatus of the present invention, the replay format can be selected according to the usage mode of the user and the status of a device. Moreover, unnecessary signals can be individually deleted, so that the amount recorded can be diminished. Hence, industrial applicability is considerably large. The present invention is not limited to the previous embodiments.

The invention claimed is:

1. A digital broadcast receiving apparatus that receives and outputs a stream to which a video signal, an audio signal and a data broadcasting signal are multiplexed, the digital broadcast receiving apparatus comprising:

- a recording section for recording signals included in the stream;
- a designating section designating a signal from among the video, audio and data broadcasting signals;
- wherein the recording section records the designated signal; and
- wherein when the designating section designates recording of the data broadcasting signal, the recording section records only the last data broadcasting signal of a program that is an object of recording.

2. The digital broadcast receiving apparatus according to claim 1, wherein the designating section designates the signal to be recorded based on a content of a program to be recorded.

3. The digital broadcast receiving apparatus according to claim 1, wherein when the designating section designates recording of the data broadcasting signal, the recording section records the data broadcasting signal of a program that is an object of recording by intermittently receiving the program.

4. A digital broadcast receiving apparatus that receives and outputs a stream to which a video signal, an audio signal and a data broadcasting signal are multiplexed, the digital broadcast receiving apparatus comprising:

a recording section for recording signals included in the stream;

a designating section designating a signal from among the video, audio and data broadcasting signals;

wherein the recording section records the designated signal;

a reservation section reserving a program to be recorded; and a prediction section predicting whether or not the program reserved by the reservation section can be recorded entirely in the recording section, wherein when the prediction section predicts than it is not possible to record all the program, the recording section records only the last data broadcasting signal of the program that is an object of recording.

5. A digital broadcast receiving apparatus that receives and outputs a stream to which a video signal, an audio signal and a data broadcasting signal are multiplexed, the digital broadcast receiving apparatus comprising:

a recording section for recording signals included in the stream; and a designating section designating a signal from among the video, audio and data broadcasting signals;

wherein the recording section records the designated signal;

wherein the recording section monitors a remaining capacity in the recording section while recording, and when the remaining capacity exceeds a predetermined value, the recording section stops the recording operation and records only the last data broadcasting signal of the program.

6. The digital broadcast receiving apparatus according to claim 1, wherein the designating section designates any combination of signals of the video signal, the audio signal and the data broadcasting signal is to be recorded.

7. A digital broadcast receiving apparatus that receives and outputs a stream to which a video signal, an audio signal and a data broadcasting signal are multiplexed, the digital broadcast receiving apparatus comprising:

a recording section for recording signals included in the stream;

a designating section designating a signal from among the video, audio and data broadcasting signals;

wherein the recording section records the designated signal;

a communication section connected to a radio communication network; a detection section detecting an incoming call through the communication section;

a setting section setting an incoming call processing operation to be performed when the incoming call is detected during the recording operation; and a control section performing the incoming call processing operation based on the setting of the setting section when the incoming call is detected during the recording operation.

8. A digital broadcast receiving apparatus that receives and outputs a stream to which a video signal, an audio signal and a data broadcasting signal are multiplexed, the digital broadcast receiving apparatus comprising:

a recording section for recording the video signal, the audio signal and the data broadcasting signal that are included in the received stream into memory;

a designating section designating a signal from among the video signal, the audio signal and the data broadcasting signal; and a deleting section deleting from memory the designated signal.

9. The digital broadcast receiving apparatus according to claim 8, further comprising:

a separating section separating the video signal, the audio signal and the data broadcasting signal from each other, which are included in the received stream, wherein, the recording section records each of the signals separated by the separating section as different files, the designating section designates the file, and the deleting section deletes the designated file.

* * * * *